US007000737B2

(12) United States Patent
Scheffer

(10) Patent No.: US 7,000,737 B2
(45) Date of Patent: Feb. 21, 2006

(54) METHOD AND APPARATUS FOR SECURING A SHOPPING CART

(75) Inventor: Ronald Scheffer, 7251 W. Lake Mead Blvd., #300, Las Vegas, NV (US) 89128

(73) Assignee: Ronald Scheffer, Las Vegas, NV (US)

( * ) Notice: Subject to any disclaimer, the term of this patent is extended or adjusted under 35 U.S.C. 154(b) by 0 days.

(21) Appl. No.: 10/851,457

(22) Filed: May 21, 2004

(65) Prior Publication Data

US 2004/0216965 A1    Nov. 4, 2004

Related U.S. Application Data

(63) Continuation-in-part of application No. 10/699,580, filed on Oct. 31, 2003, which is a continuation of application No. 10/133,209, filed on Apr. 26, 2002, now Pat. No. 6,648,103, which is a continuation-in-part of application No. 09/809,119, filed on Mar. 14, 2001, now Pat. No. 6,386,331, which is a continuation-in-part of application No. 09/396,658, filed on Sep. 15, 1999, now abandoned.

(51) Int. Cl.
B62B 5/04    (2006.01)
(52) U.S. Cl. ............................ 188/19; 188/32; 188/36; D12/217
(58) Field of Classification Search ............... 188/32, 188/36, 19; D12/217; 410/49, 9, 19, 30, 410/20, 587, 42, 36, 150; 40/587; 280/33.991–33.998; 248/346.11; 211/23–24, 20, 22, 17, 59.4; D34/17, 27, 38; D9/456; 206/504; 108/53.3
See application file for complete search history.

(56) References Cited

U.S. PATENT DOCUMENTS

| 1,427,222 A | * | 8/1922 | Miller ........................ 188/32 |
| 1,562,817 A | | 11/1925 | Wismer |
| 1,617,369 A | | 2/1927 | Blakely |
| 1,735,372 A | | 11/1929 | Block |
| 1,837,657 A | | 12/1931 | Fedderman |
| 1,915,320 A | | 6/1933 | Jones |

(Continued)

FOREIGN PATENT DOCUMENTS

DE    3728285    3/1989

(Continued)

OTHER PUBLICATIONS

Page 80 from "Brake and Front End Service", vol. 33, No. 3, 385th Monthly Issue dated Mar. 1963.*

*Primary Examiner*—Melanie Torres
(74) *Attorney, Agent, or Firm*—Weide & Miller, Ltd.

(57) ABSTRACT

A method and apparatus for securing a wheeled device such as a shopping cart is disclosed. In one embodiment, the securing structure comprises a depression formed in a support surface, such as a concrete or asphalt parking lot. The depression is configured to accept one or more wheels of a wheeled cart therein for restraining the cart. An advertising platform is located in the depression. The advertising platform bears advertising or other information. Another embodiment of the invention is an advertising platform for use with a cart securing structure which is mounted to a support surface. The platform may span the space between two securing structures, the platform having a top surface configured to bear advertising or other information.

16 Claims, 11 Drawing Sheets

U.S. PATENT DOCUMENTS

| | | | |
|---|---|---|---|
| 2,465,551 A | 3/1949 | Otterness | |
| 2,844,909 A | 7/1958 | Perchinsky | |
| D201,143 S | 5/1965 | Vigilnante | |
| 3,391,760 A | 7/1968 | Gosner | |
| 3,539,037 A | 11/1970 | Brown et al. | |
| 3,892,295 A | 7/1975 | Hahto | |
| 3,907,114 A * | 9/1975 | Ewers | 211/20 |
| 4,040,521 A | 8/1977 | Fitzpatrick | |
| 4,186,823 A | 2/1980 | White, Jr. | |
| 4,199,043 A | 4/1980 | Lankester et al. | |
| 4,242,668 A | 12/1980 | Herzog | |
| 4,320,904 A | 3/1982 | Walters et al. | |
| 4,399,893 A * | 8/1983 | Switzer | 188/32 |
| 4,442,961 A * | 4/1984 | Bott | 224/570 |
| 4,488,649 A * | 12/1984 | Mark | 211/49.1 |
| 4,524,985 A | 6/1985 | Drake | |
| 4,781,271 A | 11/1988 | Wokeck | |
| 4,832,196 A * | 5/1989 | Butler | 206/391 |
| 4,833,442 A | 5/1989 | Von Heck | |
| 4,856,659 A | 8/1989 | Krebs | |
| 4,911,270 A | 3/1990 | Hudson | |
| 4,919,563 A | 4/1990 | Stice | |
| 5,069,311 A | 12/1991 | Young | |
| 5,201,426 A * | 4/1993 | Cruwell, Jr. | 211/17 |
| 5,210,903 A | 5/1993 | Horning | |
| 5,301,818 A | 4/1994 | Dix | |
| 5,353,446 A | 10/1994 | Baranowski | |
| 5,383,639 A | 1/1995 | Byard | |
| 5,427,209 A | 6/1995 | Tannehill et al. | |
| D381,180 S * | 7/1997 | Schueneman et al. | D34/38 |
| D408,737 S * | 4/1999 | Warren, Jr. | D9/456 |
| 6,125,972 A | 10/2000 | French et al. | |
| 6,186,283 B1 | 2/2001 | Luker | |
| 6,336,527 B1 | 1/2002 | Metz | |
| 6,386,331 B1 | 5/2002 | Scheffer | |
| 2002/0121978 A1 | 9/2002 | Wieth et al. | |

FOREIGN PATENT DOCUMENTS

| | | |
|---|---|---|
| DE | 3812361 | 9/1989 |
| FR | 1250144 | 2/1960 |
| JP | 7277159 | 10/1955 |

\* cited by examiner

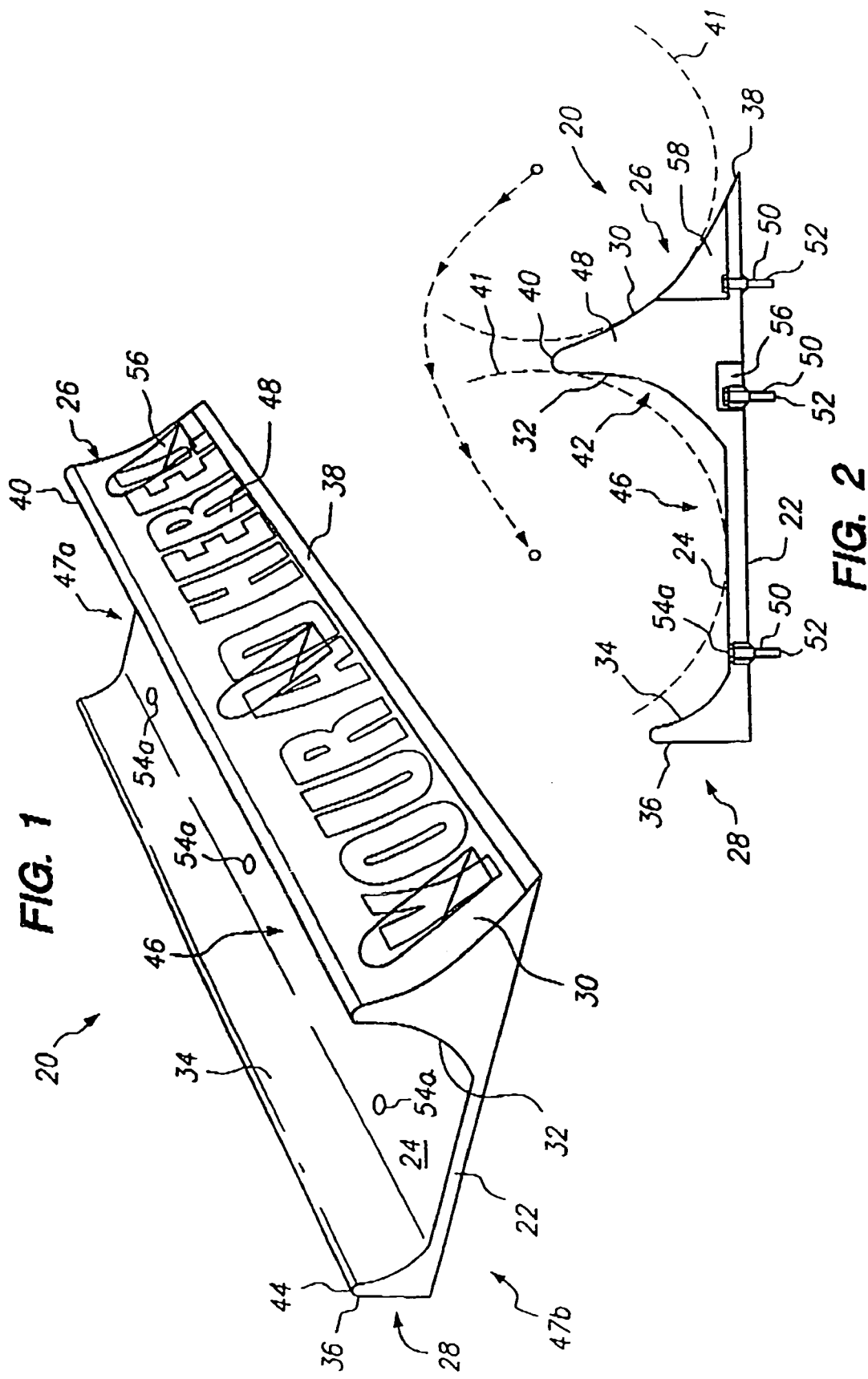

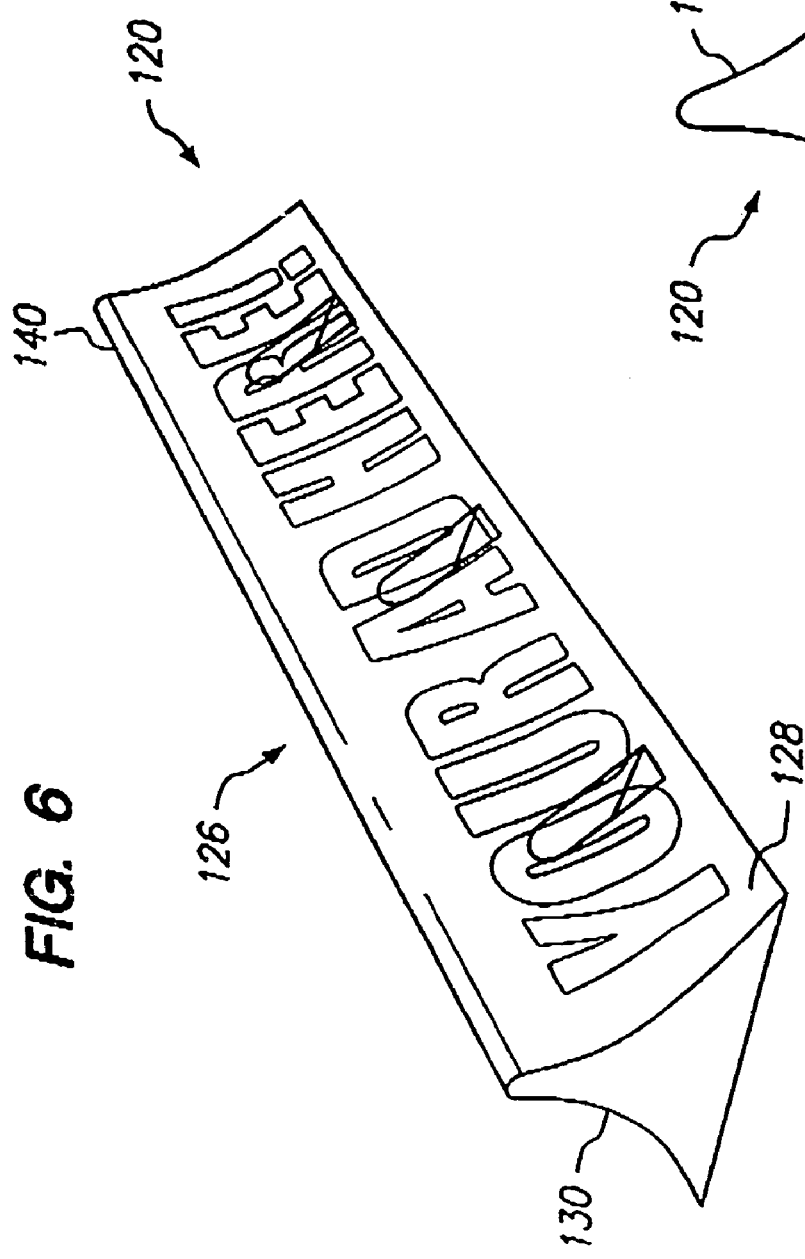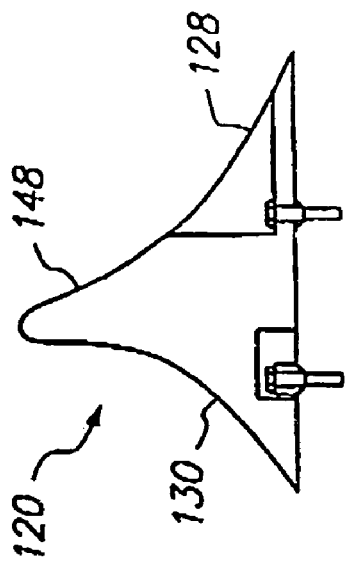

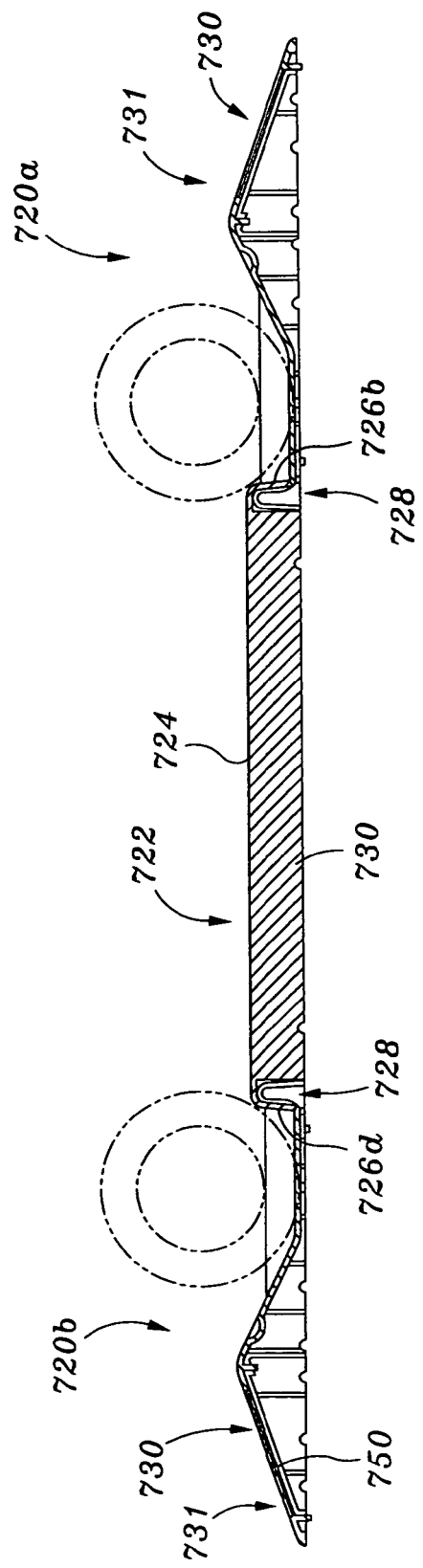

METHOD AND APPARATUS FOR SECURING A SHOPPING CART

PRIOR APPLICATION DATA

This application is a continuation-in-part of U.S. application Ser. No. 10/699,580 filed Oct. 31, 2003, which is a continuation of U.S. application Ser. No. 10/133,209 filed Apr. 26, 2002, now U.S. Pat. No. 6,648,103, which is a continuation-in-part of U.S. application Ser. No. 09/809,119 filed Mar. 14, 2001, now U.S. Pat. No. 6,386,331, which is a continuation-in-part of U.S. application Ser. No. 09/396,658 filed Sep. 15, 1999, now abandoned.

FIELD OF THE INVENTION

The present invention relates to a method and apparatus for securing a wheeled device, and more particularly, to a method and apparatus for securing a shopping cart.

BACKGROUND OF THE INVENTION

When shopping at a retail establishment, a customer often wishes to obtain or purchase a number of goods. The customer may not be able to carry all of the goods to the check-out area or to their car. In order to alleviate this problem, many retail establishments provide shopping baskets or carts. A problem with baskets is that the customer still must carry the basket while shopping. If the customer shops for a long period of time or if a number of goods are purchased, the customer may find it uncomfortable if not impossible to carry the basket and goods.

Wheeled shopping carts provide a storage area for the goods a customer wishes to purchase and makes it easy for the customer to transport the goods. A customer pushes the cart about the establishment, placing goods in the cart along the way. Ultimately, the customer pushes the cart placing goods in the cart along the way. Ultimately, the customer pushes the cart to a check-out or purchase point. Once the goods have been paid for, the customer normally still needs a convenient means to transport the goods from the establishment, such as to their car or home.

The parking areas of many establishments are often quite large and the distance from the check-out area of the establishment to a customer's car may be quite far. Usually, the retail establishment permits the customer to utilize the cart for this purpose. After purchasing their goods, customers may push the loaded cart from the establishment over a parking area to their car. The customer then unloads the goods from the cart.

A problem now arises in that the cart is located outside of the establishment. Most customers are unwilling to push the now empty cart back into the retail establishment, and thus the cart is left in the parking area. Because the cart is wheeled, once left unattended the cart may roll about the parking lot. Wind and gravity may cause the cart to roll at various speeds and in a variety of directions.

The unattended or "runaway" cart as such carts are often referred to may roll away and be lost by the retail establishment, at great cost to the establishment. Moreover, the carts may cause injury and damage. For example, the cart may roll into a vehicle parked in the parking lot and damage it. The carts may also roll into moving traffic or into pedestrians, also causing damage and injury. Because of the rather high incidence of damage caused by unattended carts, but not wishing to take away the convenience of providing the carts to customers, many establishments post signs warning that damage from run-away and unattended carts may cause damage and stating that the establishment is not responsible for damage thereby. Nonetheless, retailers often have many claims filed against them every year arising from runaway cart damage and injury.

As one attempt to alleviate the above-stated problems, some establishments have created cart return areas in their parking areas. These areas generally comprise an area closed on two or more sides by fence-like structures. It is intended that once a customer is done using a cart, the customer will roll the cart to one of the semi-enclosed cart return areas.

There are several problems with this attempted solution. The apparatus comprising the cart return normally comprises a tubular aluminum or other metal structure. The structure may be quite large and relatively expensive. The cart return areas normally consume several parking spaces in the parking area. Because of the size and cost, an establishment may only provide one or two cart returns in their parking area.

Because of the limited number of cart returns and the likelihood that a cart return may still be a significant distance from a customer's car, many customers still do not return their carts. In addition, the configuration of the cart return does not ensure that those carts which are returned are secured. The semi-enclosed nature of the return permits customers to push the carts into the return area. The carts are generally secured by being prevented from rolling away by engaging a portion (such as a long horizontal rail) of the cart return structure. Because one or more portions of the cart return are open and the wheels of the returned carts are not engaged, one or more carts may still roll out of the cart return area and into the main area of the parking lot.

Some security devices have been proposed to prevent customers from removing carts from the area of an establishment. Some of these devices are arranged to lock one or more wheels of the cart. Such devices are intended to prevent the theft or negligent removal of carts and are not useful in solving the above-stated problem. First, these devices generally are arranged to "trigger" when the cart reaches an outer perimeter beyond which the customer is not permitted to travel with the cart. It is not feasible to arrange such a device to trigger once a cart is left unattended at any particular point in a parking lot to prevent the cart from rolling away once unattended. Once the lock is triggered, store/owner personnel must reset the lock in order for the cart to be useful. It is also not feasible to have an arrangement where once a cart is left unattended, such as in a parking lot after use, a lock is triggered which must be reset in order for the cart to be reused. This arrangement would cause substantial time and money loss in resetting the locks.

A method and apparatus for securing a cart which overcomes the above-stated problems is desired.

SUMMARY OF THE INVENTION

The present invention is a method and apparatus for securing a shopping or similar wheeled cart In accordance with one embodiment of the invention there is provided a cart securing structure for securing a cart having at least one wheel. The cart securing structure comprises a body having a bottom surface for engaging a support surface and a top surface defining at least one first stop having a first face and a second face. The first face slopes upwardly from the bottom surface towards the rear face and defines a leading edge positioned near the support surface. The stop includes an apex provided between the first and second faces, the second face sloping downwardly from the apex. At least one securing element is provided for securing the cart securing structure to a support surface.

In a method of use, one or more wheels of a cart are rolled upwardly along the sloping first face of the stop. The one or more wheels are rolled over the apex and into engagement with the second face, preventing the cart from rolling away once unattended.

In accordance with another embodiment of the invention the cart securing structure includes a first stop and a second stop having a trough positioned therebetween for accepting at least one wheel of the cart between the first and second stop. The first stop has a first face sloping upwardly from the bottom surface over which a wheel of the cart may be rolled and a second face sloping downwardly towards the trough for engaging the wheel of the cart to prevent the cart from rolling away. The second stop has a first surface sloping upwardly from the trough for engaging a wheel of the cart to prevent the cart from rolling away.

In accordance with one or more embodiments of the invention, the cart securing structure includes a cover associated with the front face of a first stop. The cart securing structure may also include side members and/or upwardly extending markers.

One or more embodiments of the invention comprise a method of securing a cart securing structure of the invention to a support surface. In one method, the method comprises bolting the structure to the support surface. The structure may include one or more bores through which a fastener may pass for this purpose. In another method, the structure is secured to the support surface with adhesive. The structure may include one or more outwardly extending pins for orienting the structure.

In another embodiment of the invention, the cart securing structure includes a pair of stops which define an intermediate trough. Both stops have a front face or surface over which the wheels of a cart may be rolled into the trough. In one embodiment, the stops are generally symmetrical to one another, and have front and rear faces with generally the same slope, permitting a user to engage a cart with the structure from two sides.

In a preferred embodiment of the invention, the cart securing structure serves as an advertising platform. In one embodiment, the front face of at least one of the stops includes a recessed area for accepting an advertising placard or the like. In another embodiment, the cart securing structure includes a display system. The display system includes at least one active display such as an LCD. In one embodiment, the display system also includes a control system including a controller, photocell, motion detector, power source and a transmitter/receiver. Data, such as advertising information, may be transmitted from a remote base to the cart securing structure via the transmitter/receiver, with the controller causing the display to display the information.

In yet another embodiment of the invention, the cart securing structure comprises a depression formed in a support surface, such as a concrete or asphalt parking lot. The depression has a bottom surface. Preferably, at least one edge of the bottom surface of the depression is at the same elevation as the support surface. At least a portion of the bottom surface is positioned below the support surface. The depression is configured to accept one or more wheels of a wheeled cart therein for restraining the cart.

Preferably, an advertising platform is located in the depression. The advertising platform bears advertising or other information, such as information printed on a sticker or label attached to thereto.

Another embodiment of the invention comprises an advertising platform for use with a cart securing structure of the invention. In one embodiment, the advertising platform is configured to be mounted between a pair of cart securing structures. The platform spans the space between the two structures, and includes a top surface. The top surface is preferably generally planar. Information, such as advertising, is preferably displayed by the top surface, such as by a sticker applied to the top surface.

In one embodiment, the advertising platform is used with a pair of cart-securing structures having a trough located between a first and a second stop. A portion of the platform engages, such as by overlapping, the second stop of each securing structure, so that the platform is effectively connected to both of the cart securing structures.

Further objects, features, and advantages of the present invention over the prior art will become apparent from the detailed description of the drawings which follows, when considered with the attached figures.

DESCRIPTION OF THE DRAWINGS

FIG. 1 is a perspective view of a shopping cart dock in accordance with one embodiment of the invention;

FIG. 2 is a cross-sectional side view of the shopping cart dock illustrated in FIG. 1;

FIG. 6 is a perspective view of a shopping cart dock in accordance with another embodiment of the invention;

FIG. 7 is a side view of the shopping cart dock illustrated in FIG. 6;

FIG. 20 is a cross-sectional side view of the advertising platform and cart docks illustrated in FIG. 19.

DETAILED DESCRIPTION OF THE INVENTION

The present invention is an apparatus and method for securing a wheeled device such as a shopping cart. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the apparatus of the invention comprises a cart dock and a method of use which are particularly adapted to securing a wheeled cart. The term "cart securing structure" is also used herein to refer the cart dock apparatus.

The carts which may be secured using the apparatus of the invention are well known. In general, carts known as "shopping carts" found at groceries and similar retailers comprise a frame structure supporting a basket in which goods may be placed. The frame is generally constructed of metal, while the basket may be constructed of metal or plastic. The frame structure is rollably supported by four (4) wheels 41 (one of which is illustrated in FIG. 2). The four wheels are arranged with two (2) wheels provided at a front portion of the cart and two (2) wheels provided at a rear portion of the cart. The front wheels are generally pivotally mounted for steering the cart. The front wheels are generally spaced about 8–11 inches apart, while the rear wheels are generally spaced about 18–21 inches apart. Each wheel generally comprises a rubber tire mounted on a metal hub, the overall diameter of each wheel generally being about 5 inches. Generally, the front wheels are located along a common axis, as are the rear wheels.

Of course, the particular dimensions of the carts and the arrangements may vary. For example, as described below, the apparatus of the present invention is useful with flat-bed and other carts. Such carts are commonly found at lumber yards and the like. These carts may have front and rear wheels separated by a much larger distance than the above-described carts. The wheels of these carts may also be larger. These carts may include additional front and/or rear wheels (such as three front wheels) or even additional wheels at other locations.

Figure 4:
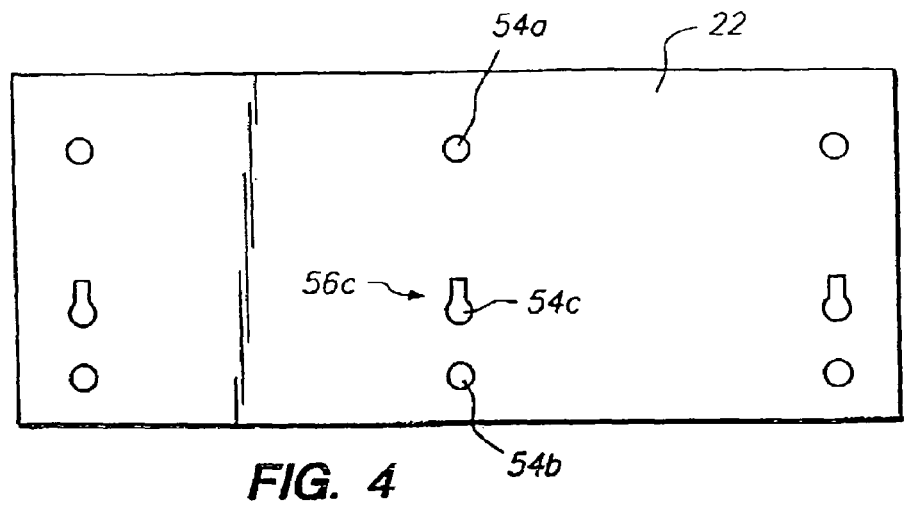
FIG. 4 is a bottom view of the shopping cart dock illustrated in FIG. 1.

Referring first to FIG. 1, a first embodiment of a cart dock 20 of the invention comprises a body having a bottom surface 22 (see FIG. 4) and a top surface 24. The body includes a first stop 26 and a second stop 28 spaced from one another. The first stop 26 has a first or front face or surface 30 and a second or rear face or surface 32. The second stop 28 has a first or front face or surface 34 and a second or rear face or surface 36. The front face 34 of the second stop 28 faces the rear face 32 of the first stop 26.

The front face 30 of the first stop 26 comprises a surface which slopes and/or angles upwardly from the bottom surface 22. The intersection of the bottom surface 22 with the front face 30 of the first stop 26 defines a leading edge 38. Preferably, the leading edge 38 is positioned near a support surface when the cart dock 20 is mounted for use. The front face 30 is sloped rearwardly towards the second stop 28 for accommodating the rolling of a shopping cart wheel 41 upwardly the front face 30. In the arrangement illustrated in FIG. 1, the front face 30 is curved.

The first stop 26 has an apex 40 formed between the front face 30 and rear face 32. The apex 40 is preferably somewhat rounded to facilitate the rolling of a wheel 41 of a shopping cart thereover.

The rear face 32 is positioned generally opposite the front face 30 and slopes downwardly from the apex 40. The slope and shape of the rear face 32 is selected to make difficult the passage of a wheel 41 of a shopping cart in the direction towards the front face 30. In other words, the first stop 26 is configured to easily permit a wheel 41 of a shopping cart to be rolled over the front face 30 towards the rear face 32, but to generally prevent movement of the wheels in the reverse direction. In this regard, in the arrangement illustrated, the rear face 32 of the first stop 26 is somewhat concave, defining a recessed area 42 for accepting a portion of a wheel 41 of a shopping cart. In the arrangement illustrated, it is desirable for the front face 30 to have a slope which is less than the slope of the rear face 32 (ex. average front face slope 60 degrees and average rear face slope of 80 degrees).

The front face 34 of the second stop 28 is also arranged to made difficult the rolling of a wheel 41 of a shopping cart thereover. In this regard, the front face 34 rises upwardly and has a slope and shape somewhat similar to the rear face 32 of the first stop 26.

The second stop 28 has an apex 44 formed between the front face 34 and rear face 36. The apex 44 is preferably somewhat rounded to facilitate the rolling of a wheel 41 of a shopping cart thereover.

The rear face 36 of the second stop 28 is generally located opposite the first face 34 and slopes downwardly from the apex 44. In the embodiment illustrated, the rear face 36 comprises a generally vertically extending wall. The rear face 36 may be sloped at other than a ninety (90) degree angle. In general, it is preferable for the rear face 36 to have a shape which deters a user from rolling a wheel 41 of a shopping cart thereover in the direction of the first stop 26. When the rear face 36 is generally vertical, this is effectuated.

A trough 46 is defined between the first stop 26 and the second stop 28. In the area of the trough 46, the top surface 24 of the dock 20 is closer to the bottom surface 22 than the apex 40 of the first stop 26 and the apex 44 of the second stop 28. The trough 46 preferably has a width or distance between the front face 34 of the second stop 28 and the rear face 32 of the first stop 26 to permit placement of a wheel 41 of a shopping cart therein.

In the embodiment illustrated, the body has to opposing ends 47a,b and both stops 26,28 and the trough 46 extend the length of the body from end 47a to end 47b. This arrangement is desirable since it permits a user to push a cart into engagement with the dock 20 at any point along the dock 20.

In one or more embodiments, where the wheel 41 of the shopping cart with which the dock 20 is to be used is approximately five (5) inches in diameter, the dock 20 has the following dimensions: height of the apex 40 from the bottom surface 22, approximately three (3) inches; height of the apex 44 from the bottom surface 22, approximately one and one-half (1.5) inches; and the distance between the first and second stops 26,28 approximately eight (8) inches.

Preferably the width of the dock 20 from end 47a to end 47b is sufficient to accommodate both the front and/or back wheels 41 of a shopping cart. For example, in the case where the front wheels of a shopping cart are spaced by about 8–11 inches, then the width of the dock 20 may be about twenty (20) inches. Such a width is common for shopping carts provided at grocery stores. In the case where the front wheels of a shopping cart are spaced by a greater distance, the width of the dock 20 may be about thirty (30) inches. The greater width dock 20 may be advantageous in accommodating flat-bed and similar high capacity carts provided at some establishments, such as lumber yards.

One or more mounting elements are provided for securing the cart dock 20 to a mounting or support surface. The support surface may comprise an asphalt or cement parking lot or any of a variety of other surfaces where a cart is used and where it is desirable to secure the cart.

Figure 5A:
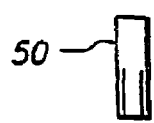
FIG. 5(a) illustrates an anchor useful in mounting the shopping cart dock illustrated in FIG. 1.
Figure 5B:
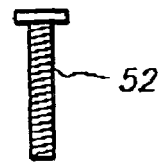
FIG. 5(b) illustrates a bolt useful with the anchor illustrated in FIG. 5(a) in mounting the shopping cart dock illustrated in FIG. 1.
Figure 8:
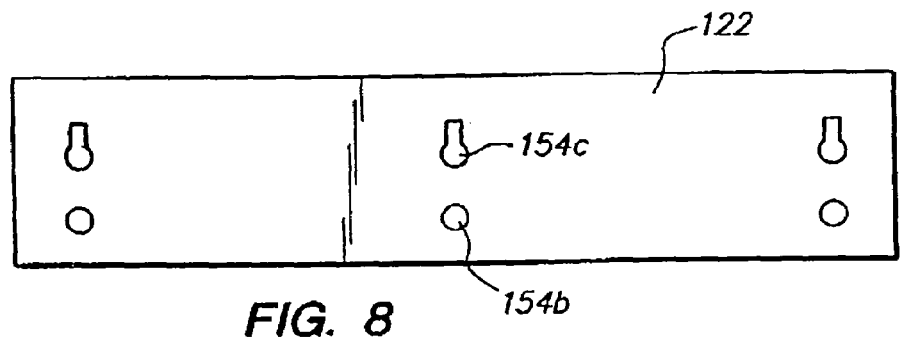
FIG. 8 is a bottom view of the shopping cart dock illustrated in FIG. 6.
Figure 9A:
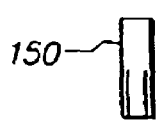
FIG. 9(a) illustrates an anchor useful in mounting the shopping cart dock illustrated in FIG. 6.
Figure 9B:
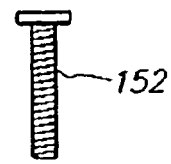
FIG. 9(b) illustrates a bolt useful with the anchor illustrated in FIG. 9(a) in mounting the shopping cart dock illustrated in FIG. 6.

Referring to FIGS. 5(a) and (b), when the cart dock 20 is to be secured to a paved or other hard surface (such as concrete, rock, asphalt, tile or the like), the mounting elements may comprise anchors 50 and bolts 52. The anchors 50 are placed in bores in the support surface. The bolts 52 then engage one or more portions of the dock 20 and an anchor 50, securing the dock 20 to the support surface.

In the arrangement illustrated in FIGS. 1–4, the cart dock 20 has nine (9) bores provided therein through which a bolt 52 or similar threaded fastener may extend. Three (3) bores 54a are provided in spaced relation through the trough 46 portion of the dock 20 near the second stop 28. Three (3) bores 54b are provided in recessed areas 57 provided in the front face 30 of the first stop 26. Three (3) bores 54c are provided in association with key-ways 56 provided in the bottom surface 22 of the dock 20 generally beneath the first stop 26.

The bores 54a provided in the trough 46 portion are generally cylindrical for passage of a bolt 52 therethrough. The recessed areas 57 comprise narrow openings having a generally flat surface through which the bores 54b extend. Each bore 54c is associated with a key-way 56 having an adjoining narrow slot.

The cart dock 20 may be constructed in a variety of manners and from a variety of materials. Preferably, the dock 20 is constructed of a durable, weather-resistant material and a material which has a "memory" in that it retains it shape. Because of the use environment of the dock 20, the dock 20 may be driven upon by vehicles. It is desirable for the dock 20 to be flexible enough to yield and both not break or cause damage to a vehicle, and at the same time return to its original shape to function effectively. In one or more embodiments, the dock 20 may be injection molded of a polypropylene or similar material.

If the dock 20 is injection molded, the dock 20 may be made hollow to reduce its weight and cost. In such event, one or more ribs or reinforcing structure may be provided (such as inside the hollow areas of the dock 20) for strengthening it.

To make the dock 20 readily visible at night, the dock 20 may be made to reflect and/or transmit light. In one arrangement, a reflective and/or light emitting material, such as a coating, may be provided on the dock 20. In another arrangement, the material may be added to or comprise a part of the material which forms the dock 20 (i.e. such as added into plastic when molded). The dock 20 may be made in a variety of colors.

In one or more embodiments, the cart dock 20 includes a face cover 48, as illustrated in FIGS. 1 and 2. The cover 48 is associated with the front face 30 of the first stop 26. In one embodiment, the cover 48 comprises a relatively flexible synthetic material which is approximately the same size and shape as the front face 30 of the first stop 26 (i.e. in this case, curved). As illustrated, the cover 48 may be removably mounted to the dock 20 with a tab which engages a small groove in the front face 30 of the first stop 26. The cover 48 may be removable attachable with hook and loop type fasteners, snaps, or other means well known to those of skill in the art.

In one or more arrangements, the front face 30 may have an inset or depressed area for accepting the cover 48. This arrangement has the advantage of inlaying or insetting the cover 48 into the surface 30 in a manner which aids in protecting the cover 48 (such as by preventing the cover 48 from being caught in the wheels 41 of a cart).

In one embodiment, the cover 48 comprises a generally transparent material having a reflective or light transmitting material associated therewith (one such material is known as "day-glow"). In this manner, the cover 48 is illuminated at night or reflects light when a headlight of an automobile shines thereon, making the dock 20 readily visible. The cover 48 may also have printing thereon. The printing may comprise advertising or instructions. Because the cover 48 is removable, new advertising or announcements may be provided on the dock 20 at various time intervals.

In accordance with one aspect of the invention there is provided a method of mounting the cart dock 20. In accordance with the method, bores are provided in the support surface. The bores may be drilled or may be provided when the surface is constructed (such as when pouring concrete). An anchor 50 is provided in each bore. A bolt 52 is connected to each anchor 50 associated with the three bores 54c. The dock 20 is placed on the surface with these three bolts 52 extending through the bores 54c of the key-way 56. The dock 20 is then moved horizontally, sliding the bolts 52 along the slot portion of the key-ways 56 so that these three bolts 52 engage the slots of the key ways 56. Bolts 52 are then passed through the bores 54a, 54b (from the top side of the cart dock 20) into the associated anchors 50. There may be a greater or lesser number of fasteners used to secure the cart dock 20.

In one or more embodiments, a cart dock 20 is provided in association with individual parking stalls of a parking lot. For example, the dock 20 may be secured to the support surface at a front corner of each marked parking stall.

In accordance with an embodiment of the invention, there is provided a method of using the cart dock 20. Referring to FIGS. 1 and 2, when a user/customer has completed using a cart, the user pushes the cart to the dock 20 (such as at the front of their car at the front of the parking stall). The user pushes the front wheels 41 of the cart up the front face 30 of the first stop 26. The wheels 41 roll over the apex 40 and into the trough 46 between the first and second stops 26,28. At this time, the cart is secured and the customer need not attend to the cart further. The front wheels 41 of the cart are secured between the first and second stops 26,28.

Figure 3:
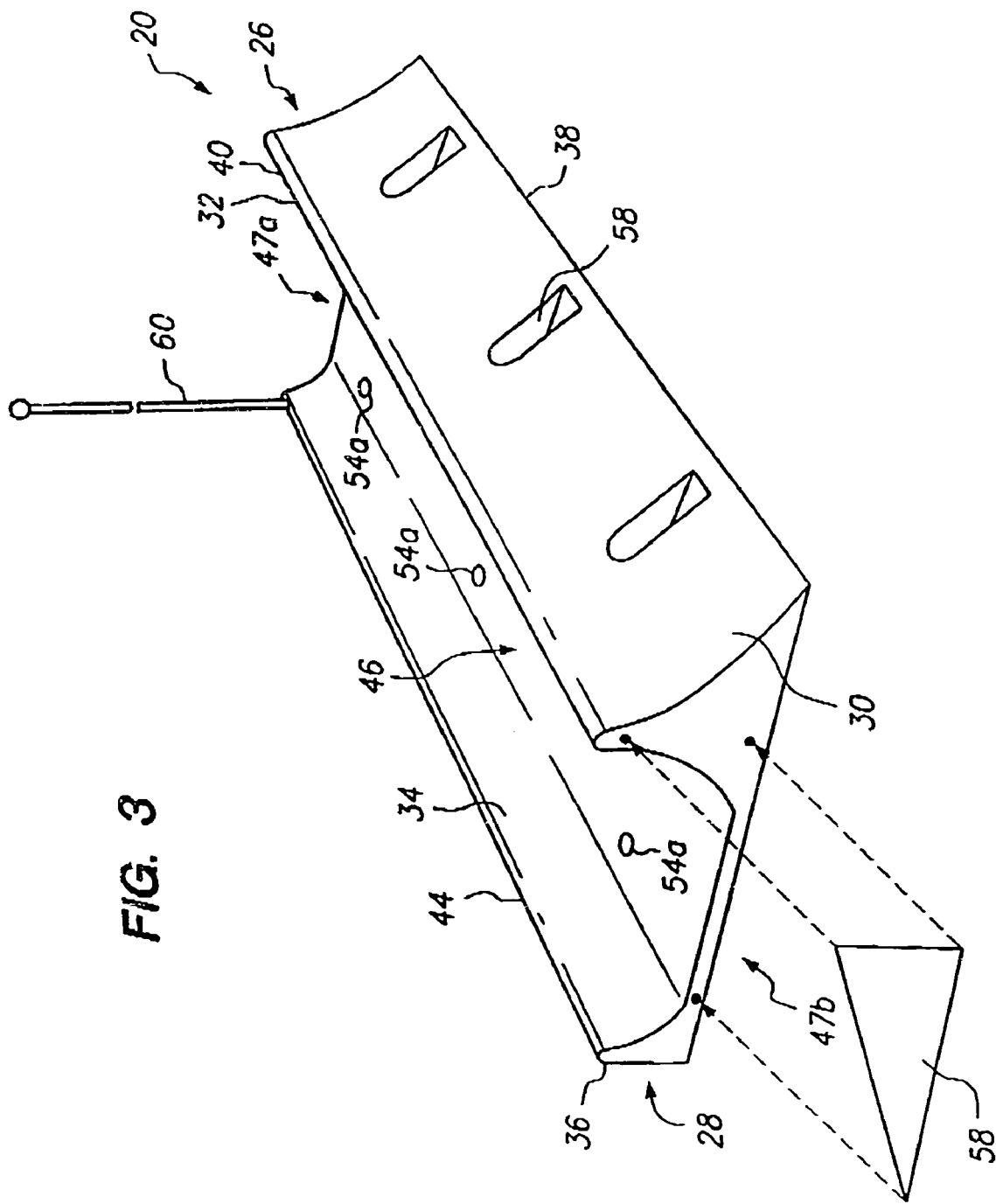
FIG. 3 is a perspective view of the shopping cart dock illustrated in FIG. 1 with a face cover thereof removed.

Referring to FIG. 3, in one or more embodiments, the dock 20 may include side members 58. The side members 58 may comprise thin plate-like members which are attached to each end 47a,47b of the dock 20. The side members 58 may be removable attachable, such as with snaps, screws or other means well known to those of skill in the art. The dock 20 may also be constructed with the side members 58 as integral (such as during a molding process). In general, the side members 58 are arranged to prevent the wheels 41 of a cart from rolling out of the trough 46 along its length (i.e. at ends 47a,47b). The side members 58 may be especially useful when a dock 20 is used on a support surface which is sloped in a direction parallel to a length of the dock 20 from end 47a to end 47b.

As also illustrated in FIG. 3, in one or more embodiments, the dock 20 may include one or more upwardly extending markers 60. Each marker 60 may comprise a flexible plastic, fiberglass or similar pole. Each marker 60 may be constructed of a variety of materials and be of a variety of sizes. Each marker 60 may be arranged to be press fit into a bore provided in the top surface 24 of the dock 20. The markers 60 may be useful in identifying the location of the cart dock 20, such as when a layer of snow covers the cart dock. To make the markers 60 more visible, they may be constructed from or have a reflective material associated therewith.

The dock 20 may have other dimensions and shapes than described above. For example, if being used with carts having bigger diameter wheels, first and second stops 26,28 may be taller. When the dock 20 has sides, the dock 20 may be molded, generally having a block-like form with a slanted or sloped front surface leading to a top surface having a trough formed therein. The trough may be positioned between (i.e. not extending the full length between) opposing ends 47a,b of the dock 20, thereby forming an enclosed area for retaining the wheels 41 of the cart.

The means for securing the cart dock 20 to a support surface may comprise other than the anchors 50 and bolts 52. For example, other threaded fasteners such as screws (such as when the dock 20 is being secured to a wooden support surface) may be used. The cart dock 20 may be staked to the support surface. One or more spikes or similar elements may be arranged to protrude from the bottom surface 22 of the dock 20 and be driven into the support surface.

As described in detail below with reference to the embodiment of the invention illustrated in FIGS. 10–12, the cart dock 20 may be glued or otherwise adhered to the surface. In this arrangement, no bores need to be provided through the body of the cart dock 20 for the fasteners.

If sufficiently weighted, the cart dock 20 may be secured to the support surface with gravity. For example, the cart dock 20 may be filled with water. To improve the adherence of the cart dock 20 to the support surface, the bottom surface 22 may be specially configured. For example, the bottom surface 22 may have ridges or another high-friction configuration.

The dock 20 as described above has many advantages. The cart dock 20 is effective in retaining an unattended shopping cart in a fixed position. Unlike cart "corrals," the wheels of the cart are engaged and prevent the cart from rolling away. Unlike wheel locks, the cart is simply unsecured by rolling its wheels out of engagement with the cart dock 20.

Because of its size and configuration, a cart dock 20 can be associated with many, if not every, parking space of a parking lot (i.e. such as a front left or right corner of each marked parking spot). In this manner, a cart dock 20 is conveniently provided next to every cart user's cart. This increases the likelihood that a cart user will return the cart to the cart dock 20 and render it secure. Numerous cart docks 20 can be provided at less cost than a single cart "corral" of the prior art.

Cart docks 20 can be placed in alignment at the front corner of each parking spot and in such a manner constitute visual "dividers" for the lot. This makes it easier for a customer to navigate the parking lot and may reduce the possibility of customers driving randomly through parking lots and causing accidents with vehicles operated within the marked lanes. As may be appreciated, many drivers do not follow parking lot painted markings. However, such drivers may be less inclined to cross the painted markings and drive randomly if such also causes them to have to drive over one or more cart docks 20.

Because of the ease of using the cart dock 20, damage and injury caused by runaway unattended carts may be reduced. The reduced financial losses associated with lost carts and other damage and injury is beneficial to the establishment and may even pay for the cart docks 20.

The embodiment of the cart dock 20 illustrated in FIG. 1 where the trough 46 extends from end 47a to end 47b has the advantage that water and other material and debris is not retained or trapped in the dock 20. As may be appreciated, this is advantageous since it is undesirable for the cart wheels to be placed into standing water and the like. Further, the water could become stagnant and contaminated. In the arrangement of the invention where the trough 46 does not extend from end to end 47a,47b or side members 58 are provided, it is desirable to provide one or more drains or outlets through which water and other material may be routed away from the dock 20.

As illustrated, the stops 26,28 and trough 46 are longitudinally extending from end to end 47a,47b of the dock 20. The stops 26,28 and trough 46 generally define planar, solid uninterrupted surfaces for contacting the wheels 41 of a cart (preferably, the recessed areas 57 are narrower than the width of the wheel of a cart). The elongate nature of the stops 26,28 and trough 46, as stated above, makes it easy for the user to dock a cart, since the user does not have to "line-up" the wheel of the cart with a specific area of the dock 20. The user may roll a cart into engagement with the dock 20 anywhere along its length. In fact, a user may secure a cart by engaging just one (1) of the wheels of a cart.

A user can secure a cart by engaging the rear wheel(s) of the cart instead of the front wheel(s). Further, though not desirable (since the cart may then protrude into a portion of an adjoining parking space or the like) a user may secure a cart by rolling the wheel(s) 41 of a cart over the second stop 28 and into engagement with the trough 46.

Referring to FIG. 6, a dock 120 in accordance with a second embodiment of the invention will be described. In accordance with this embodiment, the dock 120 has a single stop 126. The stop 126 has a front face 130 and a rear face 132. The single stop 126 is preferably shaped similar to the first stop 26 of the embodiment illustrated in FIG. 1. The front face 130 is sloped and arranged to permit the wheel(s) of a cart to be rolled thereover. The rear face 132 is arranged to engage the wheel of a cart to prevent it from rolling.

In this embodiment, the dock 120 includes two rows of bores 154b,154c for mounting the dock 120 to a support surface with anchors 150 and bolts 154. The dock 120 also includes a removable cover 148.

The cart dock 120 of this embodiment of the invention may be similarly sized as the cart dock 20 illustrated in FIG. 1. The cart dock 120 may also be mounted to a support surface in a variety of configurations and be configured and constructed from and in the variety of manners described with respect to the cart dock 20. The cart dock 120 may include side members and/or markers as described above, as well as a front cover 148.

In a method of use of this embodiment cart dock 120, a user rolls one or more wheels of a cart upwardly along the front face 130 of the stop 126. The user rolls the one or more wheels over the apex 140 and permits the one or more wheels to engage the rear face 132 of the stop 126. Once engaged, the cart is secured.

As may be appreciated, when a cart is to be secured on a very sloped surface, use of the cart dock 20 is most effective in securing the cart since the one or more wheels of the cart are prevented from rolling in both the forward and reverse directions. If the cart dock 20 is used on a sloping surface, it is desirable to secure the cart dock 20 so that the rear face 132 of the stop 126 faces up the slope, and so gravity tends to pull the wheels of the cart into engagement with the rear face 132 of the stop 126.

This embodiment of the cart dock 120 may be less expensive and complex to manufacture. Because of its reduced size and weight, this embodiment dock 120 may also be less expensive to ship.

Figure 10:
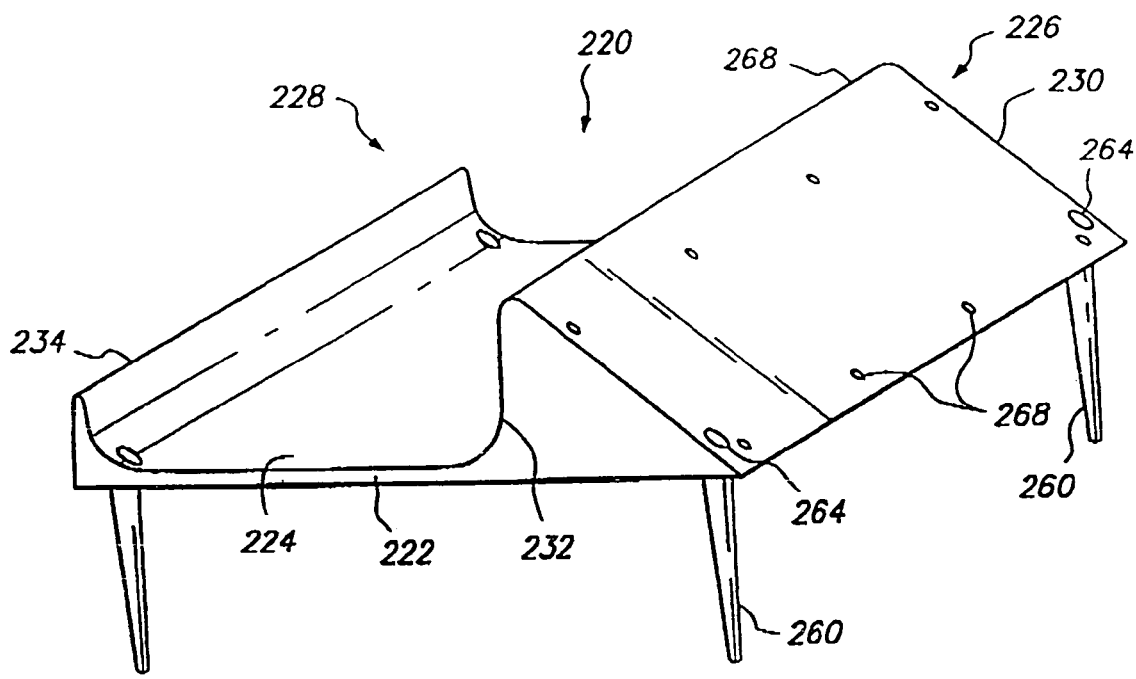
FIG. 10 is a perspective view of a shopping cart dock in accordance with another embodiment of the invention.
Figure 11:
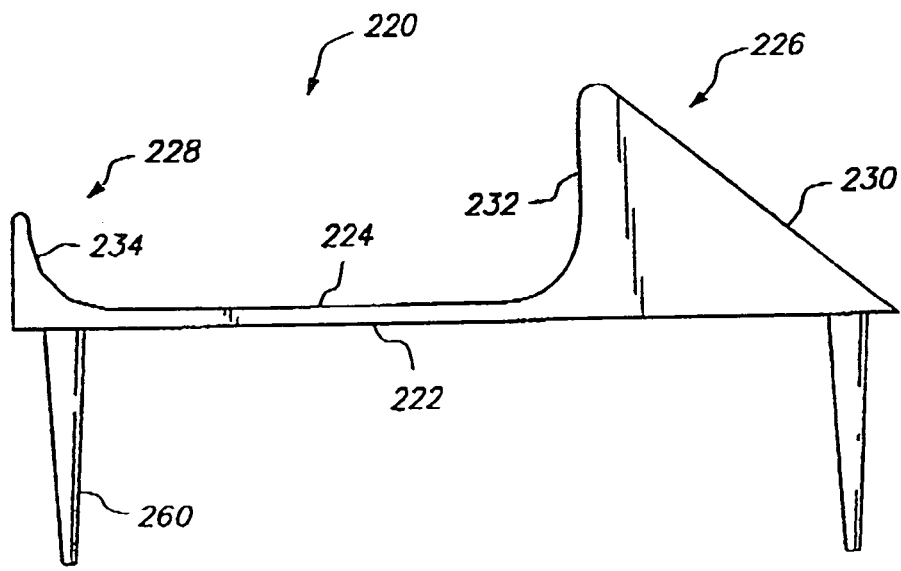
FIG. 11 is a side view of the shopping cart dock illustrated in FIG. 10.
Figure 12:
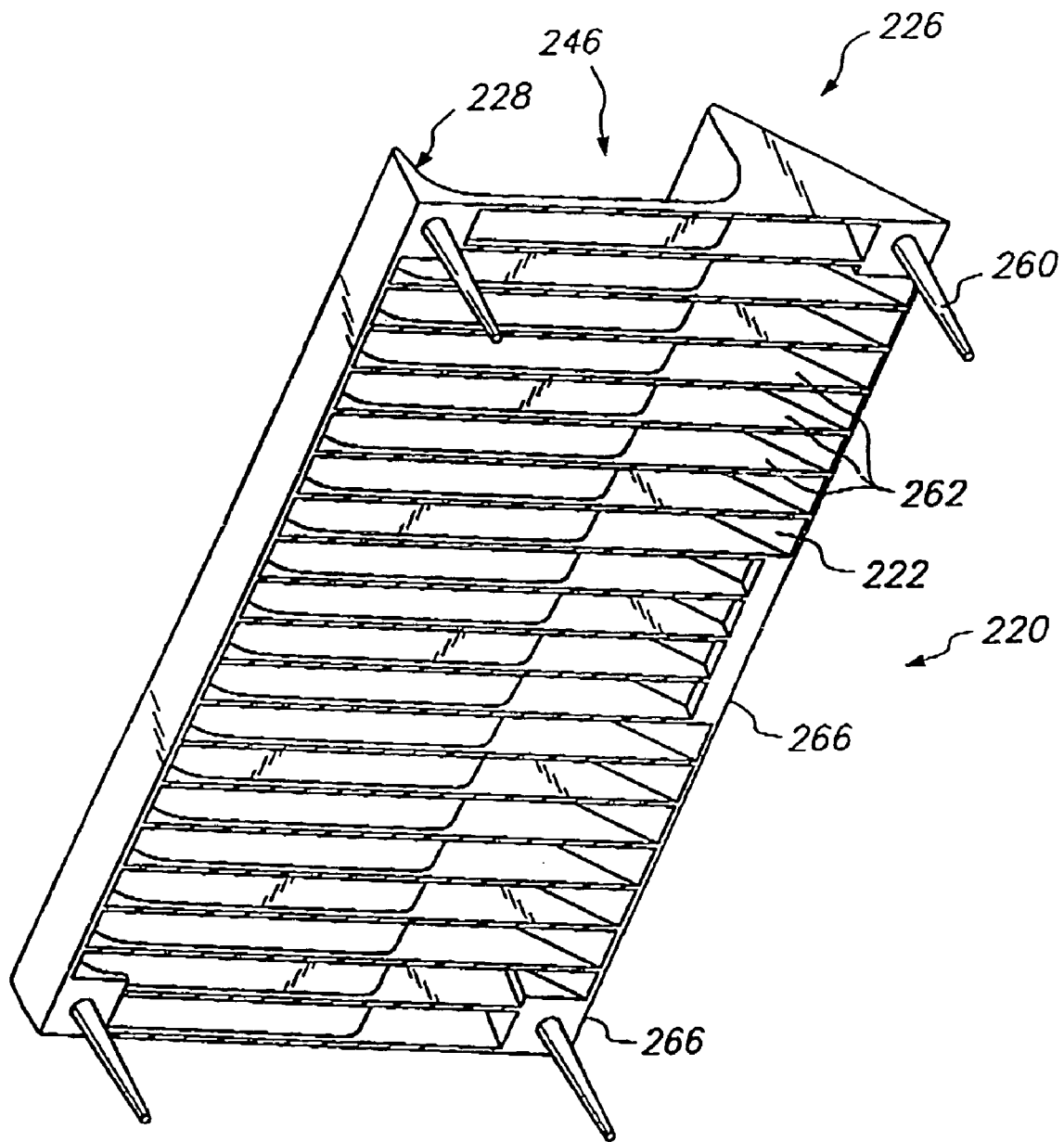
FIG. 12 is a bottom view of the shopping cart dock illustrated in FIG. 10.

Another embodiment of a cart dock 220 in accordance with the present invention is illustrated in FIGS. 10–12. This embodiment cart dock 220 is similar in many respects to the cart dock 20 in overall configuration and method of use.

The cart dock 220 includes a body having a bottom surface 222, top surface 224, first stop 226 and second stop 228. In this embodiment of the invention, a first or front surface 230 of the first stop 226 comprises a surface having a fixed, single slope (i.e. not curved, but flat angled). The second or rear surface 232 of the first stop 226 comprises a generally vertically extending ledge. Similarly, the front or first surface 234 of the second stop 228 comprises a generally vertically extending ledge or wall.

The cart dock 220 includes means for securing the body to a support surface. In this embodiment, the means comprises one or more pins 260 which extend from the bottom surface of the body. As illustrated, there are four pins 260, one pin each provided at a corner of the body. Each pin 260 is preferably tapered and extends about one-half to three (0.5 to 3) or more inches outwardly from the body.

Preferably, this embodiment cart dock 220 is secured to a support surface with an adhesive. When the cart dock 220 is to be secured to a concrete, asphalt or similar surface, the adhesive may comprise a hot-set latex/asphalt type adhesive. Of course, other adhesive materials may be used, including glues and the like. It is also possible to secure this embodiment cart dock 220 to a surface with other than adhesive, such as described above.

In order to improve the adherence of the cart dock 220 to the support surface, the bottom surface 222 includes a number of ribs 262. The ribs 262 may comprise elements which provide reinforcement for the body when the body is molded and partially hollow. The spaced arrangement of the ribs 262 creates recessed areas therebetween in which adhesive may flow, providing better adhesion of the dock 220. In the area of the trough 246, the ribs 262 preferably extend outwardly sufficient to create recessed areas.

The bottom surface 222 may include one or more pads 266 for providing solid support for the body. As illustrated, the flat pads 266 are provided adjacent the pins 260 and in one or more areas between the pins.

It will be appreciated that the cart dock 120 may be similarly configured to the cart dock 220, such as by having a generally planar sloping front face, one or more pins extending outwardly for use in securing the dock 120 or the like.

In a method of securing this embodiment cart dock 220, bores are preferably provided in the support surface, the bores sized to accept the pins 260. The bores may be provided with a drill or the like using a template of the pin positions. The adhesive may then be placed on the support surface and the bottom surface 222 of the body. The pins 260 of the cart dock 220 are then inserted into the bores, properly positioning the cart dock 220 in the desired location and adhering it to the support surface.

In accordance with this method of securing the dock 220 and its configuration, no recesses (for providing access to fastener insertion holes) need to be provided in the front face of the first stop 226. This makes construction of the dock 220 simpler and renders the front face a more contiguous surface over which cart wheels may be rolled.

In order to reduce the space occupied by multiple units of the cart dock 220 when being shipped and/or stored, one or more bores 264 may be provided in or through the top surface 224 of the cart dock 220 for mating engagement with the pins 260 of an adjacent cart dock 220. The bores 264 are preferably arranged to accept the pins 260 of a cart dock 220 which is positioned thereabove. In this manner, the cart docks 220 may be stacked vertically in a manner which reduces the total vertical stacking height. In order to prevent water from filling the bores 264, one or more drain holes, slots or the like may be provided through the pins 260.

The stacking bores 264 may be arranged to accept a marker (see FIG. 2). The depth and size of the bores 264 may vary dependent upon the desired stacking heights, sizes of the pins 260 and markers and other factors which will be appreciated to those of skill in the art.

An advantage of this embodiment cart dock 220 is that a flat face cover (not shown, but similar to cover 48 illustrated in FIG. 1) may be provided for positioning on the front face 230 of the first stop 226. As illustrated, small bores 268 may be provided for accepting pins or other protrusions (not shown) of the cover. This permits covers to be selectively attached and removed. Because the cover may be constructed flat, its manufacture may be simplified, as may be printing on it.

Figure 13:
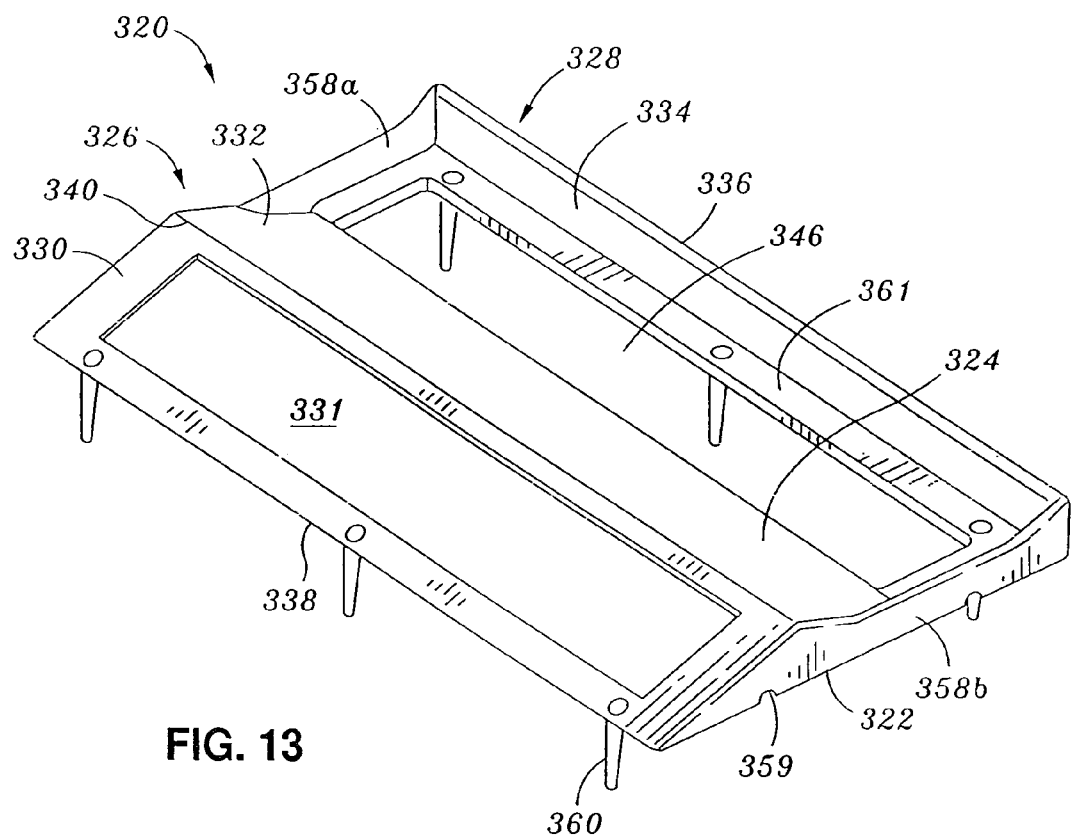
FIG. 13 is a perspective view of another embodiment cart dock in accordance with the invention.
Figure 14:
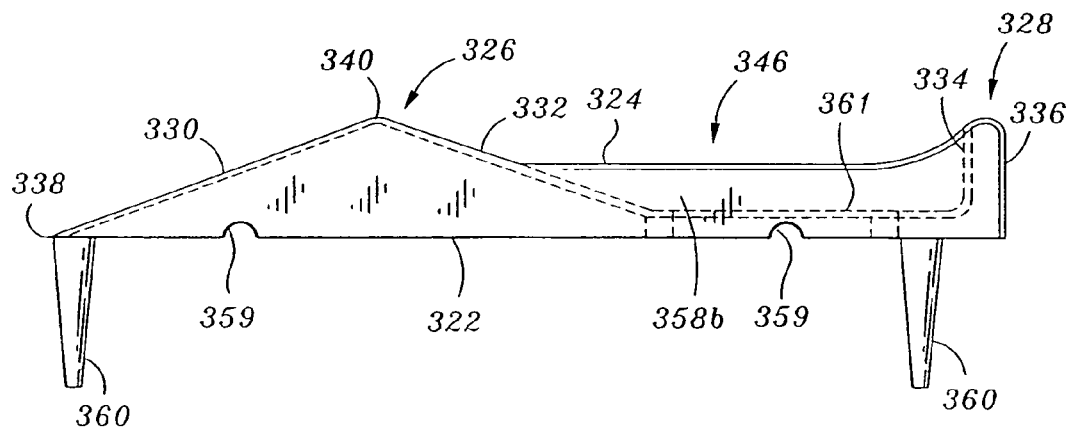
FIG. 14 is a side view of the cart dock illustrated in FIG. 13.

Another embodiment of a cart dock 320 in accordance with the present invention is illustrated in FIGS. 13 and 14. This embodiment cart dock 320 has many similar features to the cart docks described above, and some additional features. The cart dock 320 again comprises a body which includes or defines spaced first and second stops 326,328. As in the embodiment illustrated in FIG. 1, the first stop 326 defines a front face 330 and a rear face 332. As best illustrated in FIG. 14, in this embodiment the front and rear faces 330,332 are both generally planar and slope at generally the same angle with respect to horizontal.

The front face 330 slopes upwardly from a leading edge 338 to an apex 340. The rear face 332 slopes downwardly from the apex 340 to a trough 346. The trough 346 is again located between the first and second stops 326,328.

In this embodiment, a portion of the trough 346 comprises avoid or aperture between the first and second stops 326,328 in the dock 320. The aperture extends entirely through the dock 320 from the top surface through to the bottom surface. When placed on a support surface, a lower surface of this portion of the trough 346 is actually defined by a support surface on which the dock 320 is positioned rather than a surface of the dock 320 itself.

As illustrated, first and second sidewalls 358a,358b extend between the first stop 326 and the second stop 328. As detailed below, the side walls 358a,b have a variety of functions, including connecting the portions of the body defining the first and second stops 326,328. The sidewalls 358a,b each extend upwardly generally vertically.

As illustrated, the second stop 328 has a front face 334 and a rear face 336. In one or more embodiments, the front and rear faces 334,336 are generally vertically extending surfaces. In one embodiment, the height of the apex 340 of the first stop 326 and the height of the second stop 328 are about 1.6 inches. Of course, the height of the stops 326,328 may vary dependent upon the application (including the size of the wheels of the cart to be retained).

In one embodiment, one or more cut-outs or recesses 359 are provided in a lower or bottom surface 322 of the dock 320. These cut-outs 359 define passageways under the dock 320 allowing water and other material to flow between a support surface and the dock 320. As illustrated, one or more cut-outs 359 may extend under the sidewalls 358a,b thus defining a pathway from the open interior of the trough 346 to the exterior of the dock 320. As also illustrated, one or more cut-outs 359 may extend longitudinally under the first stop 326 from end-to-end. Cut-outs 359 may also be provided which extend under the first and second stops 326,328 from the aperture to a point exterior to the dock 320.

In similar fashion to the cart dock 220 illustrated in FIG. 10, the cart dock 320 includes one or more pins or spikes 360 for use in securing the dock 320 to a support surface. Of course, other means of attaching or securing the dock 220 to a support surface may be provided.

In one embodiment, a recessed area 331 is provided in the front face 330 of the first stop 326. The recessed area 331 comprises a slightly depressed area. In one embodiment, the recessed area 331 is generally rectangular in shape similar to the front face 330, but is slightly smaller in dimension. The recessed area 331 is adapted to receive a placard, sign or the like therein. It is desirable that the placard or the like have a thickness about the same as the depth of the recessed area 331, such that when the placard is placed therein, the front face 330 including the placard is generally smooth and contiguous. As described above, such a placard may be of a variety of types, and include advertising or other messages, business or product logos, information, artwork and the like. As illustrated, the cart dock 20 is arranged to receive placards in a removable fashion, permitting their replacement or exchange.

Use of the cart dock 320 is similar to the use of the cart dock 20 illustrated in FIG. 1. One particular advantage of the cart dock 320 of this embodiment relates to the construction of the trough 346. Because the trough 346 in part is defined by a void in the dock 320, the amount of material necessary to construct the cart dock 320 is reduced. This reduces the cost of manufacture and shipping of the dock 320. At the same time, the effectiveness of the dock 320 in retaining a cart is not reduced.

Another advantage of the cart dock 320 is that water, oil and the like is not trapped in the trough 346. Instead, these materials are directed to the support surface and then under the dock 320 through the cut-outs 359 to the exterior of the dock 320.

As in the prior embodiments, the cart dock 320 is preferably has sufficient length to engage both the front or both of the rear wheels of a cart at the same time. In use, a user rolls the wheels of the cart over the first stop 326 and into the trough 346. The wheels of the cart are retained in the trough 346 between the first and second stops 326,328. Generally, the wheels of the cart will rest upon the support surface while positioned in the trough 346. Movement of the wheels along and out of the trough 346 at the ends of the dock 320 is prevented by the side walls 358a,b.

Depending upon the construction of the dock 320, a lip 361 is formed around the aperture which forms a portion of the trough 346. As illustrated, the void is generally rectangular in shape. The lip 361 is a ledge at the termination of the material forming the dock 320 and the aperture there through. The lip 361 defines at least a portion of the perimeter of the aperture. In one embodiment, such as illustrated, the lip 361 extends inwardly from the side walls 358a,b and second stop 328 defining a ledge or platform. The lip 361 serves to increase the strength of the dock 320 and to prevent the bending and other movement of portions thereof relative to others. In addition, the lip 361 also serves as a small stop which inhibits movement of the wheels of a cart resting upon the support surface within the trough 346.

Figure 15:
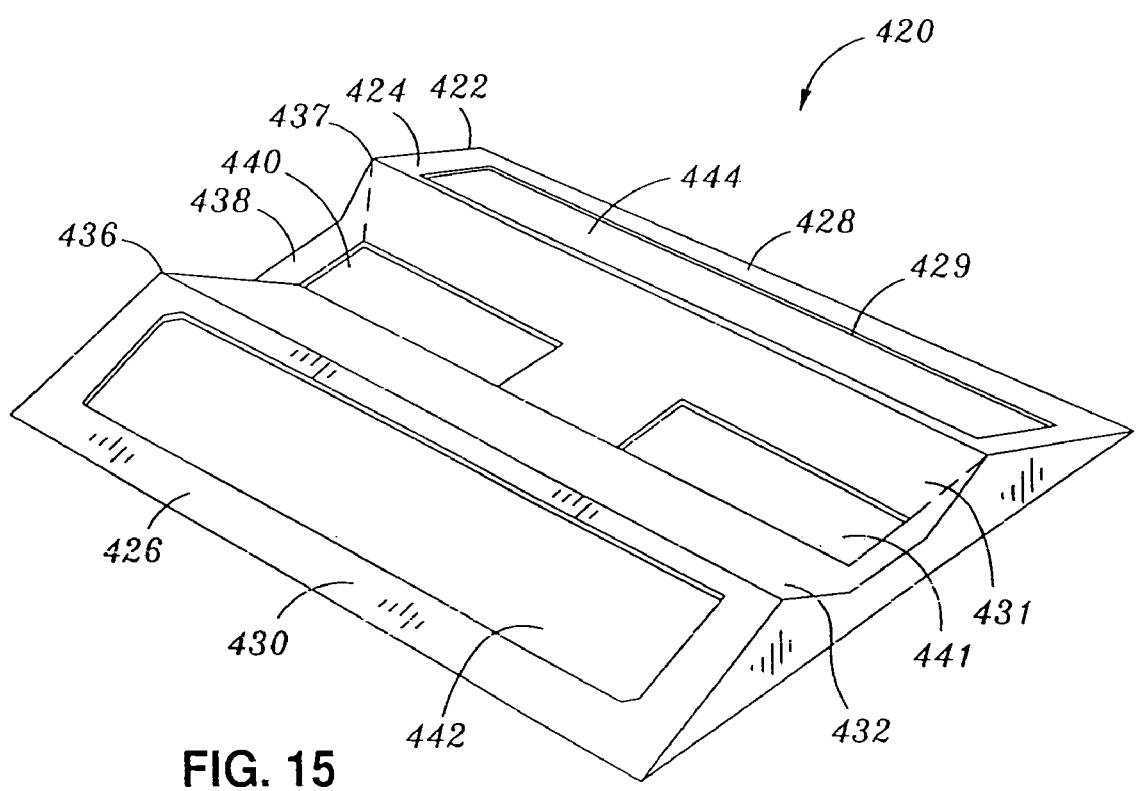
FIG. 15 is a perspective view of another embodiment of the cart dock in accordance with the invention.

Another embodiment of a cart dock 420 in accordance with the present invention is illustrated in FIG. 15. In this embodiment, the cart dock 420 is generally symmetrically configured and is specifically adapted to permit the wheels of a cart to be rolled into engagement from either side of the cart dock 420. In other embodiments, the cart dock 420 may be asymmetrical, but still provide this function.

In the embodiment illustrated, the cart dock 420 again comprises a body having a bottom surface 422 and a top surface 424. Having the symmetrical design as illustrated, the cart dock 420 again includes a first stop 426 and a second stop 428, but these stops are generally identical in shape. The first stop 426 has a front face 430 and a rear face 432. Similarly, the second stop 428 has a front face 429 and a rear face 431. In one embodiment, the front and rear faces 429,430,431, and 432 of both the first stop 426 and the second stop 428 generally slope at the same angle.

The front face 430 of the first stop 426 and the front face 429 of the second stop 428 again comprises a surface which slopes and/or angles upwardly from a leading edge to an apex 436,437. This surface is designed to permit the wheels of a cart to be rolled upwardly along the surface from the leading edge to the apex 436,437.

The rear face 432 of the first stop 426 and the rear face 431 of the second stop 428 slopes downwardly from the apex 436,437 to a trough 438. In this embodiment, the trough 438 is located between the two stops 426,428.

In one embodiment, a pair of voids or apertures 440,441 are located in the trough 438 between the two stops 426,428 of the cart dock 420. In another embodiment, there may be a single aperture or more than two apertures. In the preferred embodiment, two apertures 440,441 are provided since they advantageously correspond to a pair of wheels of a cart which is docked to the cart dock 420.

The apertures 440,441 extend entirely through the cart dock 420 from the top surface 424 to the bottom surface 422. It will be appreciated that when the cart dock 420 is placed on a support surface, a terminus of each of the apertures 440,441 is defined by the support surface on which the cart dock 420 is positioned rather than a surface of the cart dock itself.

In one embodiment, side walls may extend upwardly from the trough 438 between the first and second stops 426,428. These side walls may have a variety of shapes and functions, including connecting the first and second stops 426,428 and providing additional structural rigidity to the cart dock 420.

In a preferred embodiment, a recessed area 442 is provided in the front face 430 of the first stop 426 and a recessed area 444 is provided in the front face 429 of the second stop 428. The recessed areas 442,444 comprise a slightly depressed area. In one embodiment, the recessed areas 442,444 are rectangular and adapted to receive a placard or the like, such as for displaying information or advertising.

It will be appreciated that the use of this cart dock 420 is similar to use of the cart dock 20 in FIG. 1. This cart dock 420 is particular suited to having the wheels of a cart secured by rolling the wheels over either of the first or second stops 426,428 into engagement with the trough 438. For example, the wheels of a cart may be rolled upwardly along the front face 430 of the first stop 426 and down into the trough 438. In that position, the wheels of the cart are secured between the two stops 426,428, and in particular the rear faces 431,432 of those stops. Likewise, the wheels of a cart may be rolled into a similar position by rolling the wheels upwardly along the front face 429 of the second stop 428.

As indicated, in the illustrated embodiment, the slope of the front 429,430 and the rear faces 431,432 of both the first and second stops 426,428 is generally the same. In other embodiments, the slopes of the front and rear faces may be different. For example, the rear faces 431,432 may be steeper. Also, the slopes of the faces 429,430 of the first and second stops 426,428, as well as the heights of those stops do not necessary need to be the same. For example, if the cart dock 420 is to be used on a sloping surface, the height and steepness of the faces of the "downslope" stop may be increased.

As described above, the cart dock 420 is particularly suited for use as an advertising or informational platform. For example, as described above, advertising may be associated with the sloping face of the stop or stops of the cart dock. The advertising or other information may be printed on a placard or similar element which is affixed to the cart dock.

Figure 16:
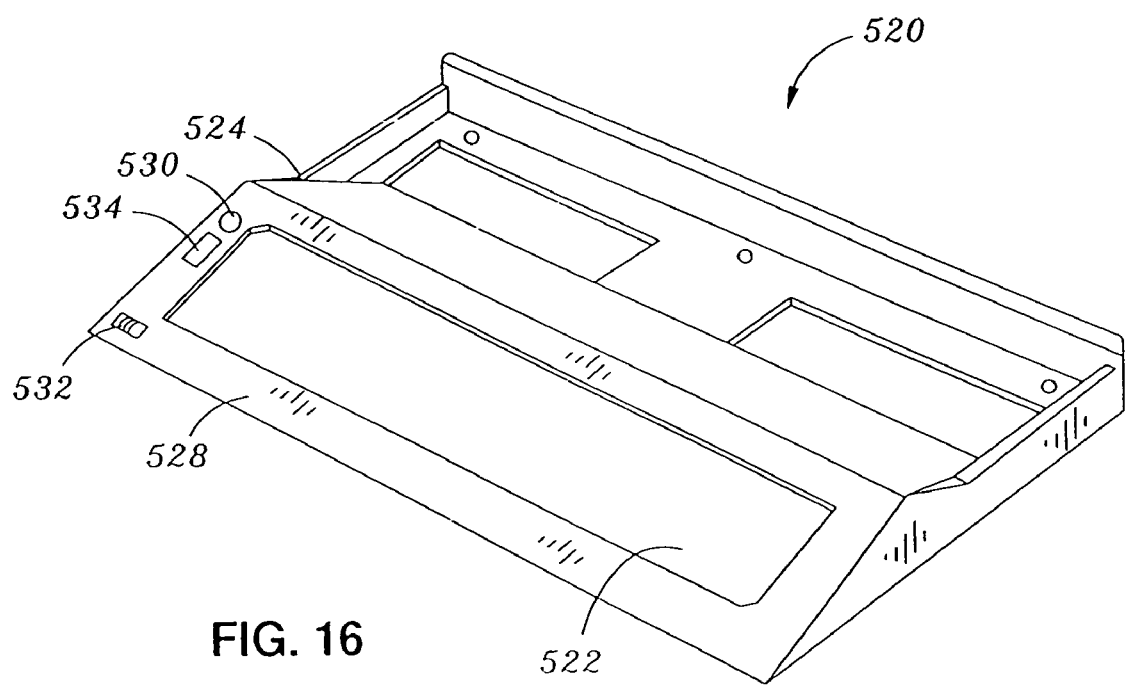
FIG. 16 is a perspective view of yet another embodiment of the cart dock in accordance with the invention, the cart dock including an active display.

In accordance with one embodiment of the invention, the cart dock of the invention may include a display. FIG. 16 illustrates one embodiment of a cart dock 520 including a display system including an active display 522.

The cart dock 520 illustrated in FIG. 16 is similar in overall configuration to the cart dock 320 described above. It will be appreciated that this aspect of the invention may be applied to any of the embodiments of cart docks specifically described herein or otherwise in accordance with the invention.

In a preferred embodiment, the active display 522 is associated with a front face 528 of the cart dock 520. The active display 522 comprises a means for displaying information. In a preferred embodiment the display is "active" in that the information which is displayed may be readily changed.

In a preferred embodiment, the active display 522 is an LCD display. In one or more embodiments, the active display 522 may comprise plasma, LED, CRT or other types of displays now known or later developed. It will be appreciated that the particular type and configuration of the display which is utilized is dependent in part upon its application, including the size and shape of the cart dock with which it is associated. Preferably, the display 522 has a generally planar front face or is located behind or beneath a clear or opaque member, so that the front face 528 of the cart dock 520 facilitates the rolling of the wheels of a cart thereover in the manner described in greater detail above. At the same time, however, the display is preferably readily visible to a user or viewer of the cart dock 520.

Figure 17:
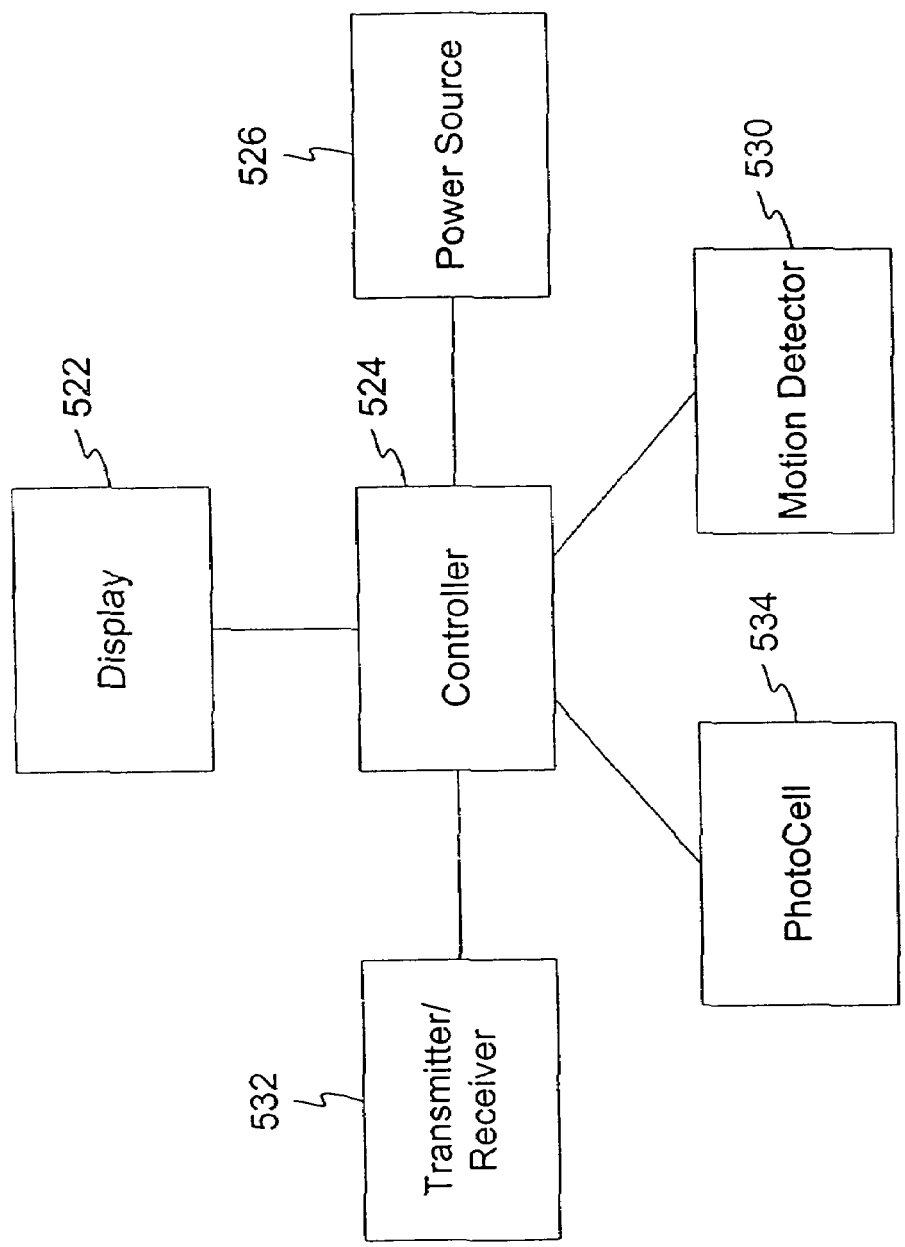
FIG. 17 is a schematic illustrating one embodiment of a display system including the display of the cart dock illustrated in FIG. 16.

In one embodiment, the display system of the cart dock 520 includes various components for controlling the operation of the active display 522. FIG. 17 illustrates one embodiment of a control system for the active display 522. In the embodiment illustrated, the system includes a controller 524, a power source 526, a motion detector 530 and a transmitter 532.

In a preferred embodiment, the controller 524 comprises a processor or similar element. The controller 524 may comprise hardware and/or software. The processor provides a processing environment whereby various outputs are generated in response to various inputs. In one embodiment, the inputs may comprise a signal from the transmitter 532, motion detector 530, photocell 534 or other elements.

In general, the controller 524 is preferably configured to control the operation of the activity display 522. The method and means of control may be by preprogrammed control strategy based upon various inputs and desired outputs. The control strategy may be preprogrammed or, in one embodiment, updated or implemented from a remote location.

In this regard, the controller 524 may include a memory for storing control code. As indicated, however, the programming may be implemented as hardware.

In one embodiment, the various components of the system, including the display 522, are powered by a power source 526. In one embodiment, the power source 526 comprises a battery mounted to the cart dock 520.

In one embodiment, the photocell 534 comprises a means for detecting whether the cart dock 520 is exposed to light or not. The photocell 534 may be configured to provide one or more signals to the controller 524 to indicate this condition. For example, the photocell 534 may provide an output when it is exposed to light, while it provides no output when it is not exposed to light. As illustrated in FIG. 16, the photocell 534 is preferably mounted to the cart dock 520, such as at the front face 528.

The controller 524 preferably utilizes the output from the photocell 534 to control the active display 522. In one embodiment, the controller 524 may turn the active display 522 off when the photocell 534 indicates that it is dark, thus conserving power. In one embodiment, the active display 522 may be back-lit or comprise a type of display which is readable without ambient light. In one embodiment, the controller 524 may cause, for example, the active display 522 to be back-lit when it is dark, but cause the active display 522 to operate without back-lighting and conserve energy when it is light out.

In one embodiment, the motion detector 530 comprises a means for sensing the movement of an object in the vicinity of the cart dock 520. Like the photocell 534, the motion detector 530 may provide one or more output signals to the controller 524. In one embodiment, when the motion detector 530 senses motion, it provides a signal to the controller 524. In response, the controller 524 may be configured to cause the active display 522 to operate for a predetermined period of time. Once that predetermined period of time expires, the active display 522 may be turned off to conserve energy.

As illustrated in FIG. 16, the motion detector 530 is mounted to the cart dock 520. In one embodiment, the motion detector 530 is located at the front face 528 of the cart dock 520. The motion detector 530 may be mounted in other locations. Mounting at the front face 528 has the advantage that the motion detector 530 senses motion associated with a person's activity in front of the cart dock 520 where, if the display is activated, the person will see the display.

In one embodiment, the transmitter/receiver 532 is configured to receive information or data from a remote location and transmit information or data to a remote location. In one embodiment, the transmitter/receiver 532 comprises a wireless communication interface, such as one implementing an infrared or IEEE 802.11xx wireless communication protocol.

The transmitter/receiver 532 is mounted to the cart dock 520. As illustrated, the transmitter/receiver 532 is located at the front face 528 of the cart dock 520. The transmitter/receiver 532 may be located in other positions. The location may be chosen to provide the best communication path to a remote base.

In one embodiment, though not illustrated, the transmitter/receiver 532 is configured to receive information or data transmitted from a remote base or station. In the case where the cart dock 520 is located in a store parking lot, the remote base or station may be located within the store. In this configuration, a user of the remote base may send data, such as revised control instructions or particular information to be displayed by the active display 522, to the system. For example, the user may enter specific advertising information and transmit that information to the system. The controller 524 may process the information and then cause the active display 522 to display that information. In this arrangement, an operator may easily change the information which is displayed.

The transmitter/receiver 532 may also send information or data to the remote base or station. For example, in the event of a low battery, malfunction or the like, a signal may be transmitted by the transmitter/receiver 532 to the remote base or station. The operator may then effect repairs.

The system may include a variety of other components or not include the components described. For example, the system might include a small solar cell for charging the battery.

One embodiment of the invention comprises a cart dock and advertising system. The system includes a plurality of cart docks along with at least one base station. The base station may include a controller, such as a computer, as well as a transmitter/receiver. The base station is configured to accept input from a user and transmit data, such as advertising information, to the cart docks. In one embodiment, each cart dock may be provided with a unique identification code so that information may be directed to a particular cart dock or group of cart docks. Also, using the identifier, a signal transmitted from a particular cart dock may be used to identify that cart dock, including its location.

A unique aspect of the cart dock of the present invention is the ability of the cart dock to be used as an advertising platform as well as a useful cart restraining device. As noted above, the cart docks are adapted to be located in parking lots and similar locations where they are readily visible to customers. The cart docks are visible to customers parking their cars, walking through the parking lot or securing a cart. Because of the number of cart docks which may be located in a single parking lot, the total advertising or information exposure to these customers is tremendous.

As detailed above and illustrated in the figures, the cart dock of the invention includes one or more surfaces particularly suited to placement of this information. In particular, the front face of the first stop of the cart dock has a substantial horizontal dimension for presenting text (whether imprinted directly thereon or associated with replaceable placards or the like). Moreover, the angle of the front face of the stop is such that the face is directed upwardly and outwardly towards a customer or other reader, and thus readily visible whether the customer is driving a car or walking.

Because of this unique feature of the invention, businesses employing the cart dock not only address the problems associated with the carts but can provide information to their customers. This information, such as advertising, can be used to generate a revenue stream or increase a revenue stream. For example, a business having cart docks located in their parking lot may lease advertising space to other businesses, thus generating a new stream of revenue. A business may also advertise on their own cart docks, thus increasing the revenue generated by consumers at their own business.

Thus, as one aspect of the invention there is a method of advertising comprising locating a cart (or similar device) restraining structure in association with a support surface, such as a parking lot. The method includes locating advertising or other information on a surface of the restraining structure. In one or more embodiments, the advertising or other information may be periodically changed (such as by replacing a removable placard or cover). In one embodiment, the method includes the step of selling or leasing the advertising space.

In one embodiment, the advertising or other information may be presented via a display device, such as the active display 522 of the cart dock 520 illustrated in FIG. 16. Advantages of such a display include the ability to present different information at different cart docks, and to vary the information easily over time. As indicated, in one embodiment, an operator may transmit data from a remote base station to one or more cart docks and change or update the information which is displayed. Another advantage of these displays is that they may be readable in the dark or in other conditions where printed advertising is less visible.

Figure 18:
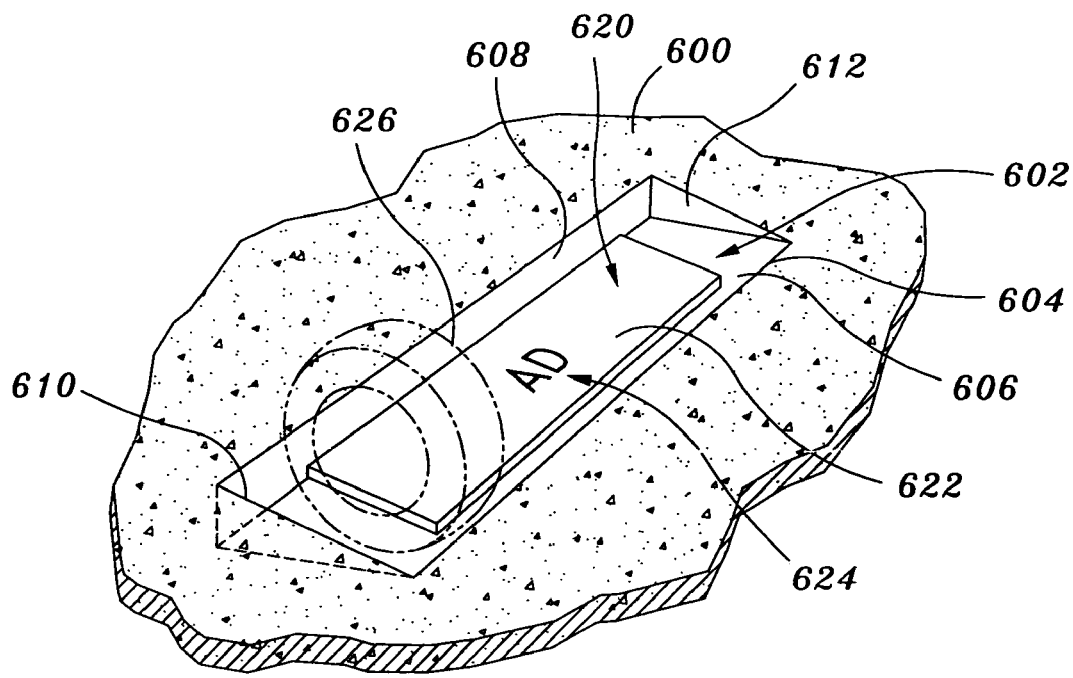
FIG. 18 illustrates yet another embodiment cart dock in accordance with the invention, the cart dock including a depression in a support surface.

Another embodiment of the invention will be described with reference to FIG. 18. As illustrated therein, a cart is configured to be moved on a support surface 600. As described above, that surface 600 may be a parking lot. Of course, such surfaces may be constructed from a variety of materials. Generally, the surface 600 is constructed from asphalt, concrete or a similar durable, continuous hard surface.

In accordance with an embodiment of the invention, a depression 602 is formed in the surface 600. The depression 602 may have a variety of configurations. In one embodiment, the depression 602 has a leading edge 604. The depression 602 has a bottom surface 606. At the leading edge 604, the bottom surface 606 is preferably at the same level or elevation as the surface 600. The depression 602 also has a rear edge or wall 608. The bottom surface 606 of the depression 602 at the rear edge or wall 608 is preferably inset or depressed into the surface 600.

The depression 602 has a first side 610 and a second side 612. Preferably, the distance between the first and second sides 610, 612 is greater than the distance between a pair of wheels of a cart to be located in the depression 602, permitting the wheels to roll into the depression 602. Similarly, the distance from the leading edge 604 to the rear edge or wall 606 is preferably great enough to accept at least a portion of a wheel of a cart therein.

In the embodiment illustrated, the bottom surface 606 of the depression 602 slopes at a generally constant rate from the leading edge 604 to the rear edge or wall 608. In one embodiment, the bottom surface 606 slopes so that the depth of the bottom surface 606 from the surface 600 is approximately 2–4 inches. The depth may be a greater or lesser amount, however, depending on a variety of factors.

As illustrated, in a preferred embodiment, an advertising platform 620 is preferably located in the depression 602. In one embodiment the advertising platform 620 is a generally planar support member having a top surface 622 configured to display advertising 624. The member may be, for example, a generally thin plastic plate. The advertising platform 620 is preferably connected to the bottom surface 606, such as with adhesive.

The advertising platform 620 and/or the advertising 624 may vary in size and shape. In one embodiment, the advertising platform 620 extends from approximately the first side 610 to the second side 612 of the depression 602, and over a substantial portion of the bottom surface 606 from the leading edge 604 to the rear edge or wall 608.

In use, one or more, and preferably two (such as the pair of front or rear) wheels 626 of a cart are rolled into the depression 604. In this position, the cart is secured, as the wheels 626 are contained in the depression 604.

This embodiment of the invention has numerous advantages. In areas where snowfall is frequent, snow plows may be used to clear the surface 600 of snow. This embodiment cart dock does not interfere with these snow plows (such as the blades or augers thereof), because the cart dock is located below the top of the surface 600.

In the configuration illustrated, the depression 604 has a smooth sloping bottom surface 606, making it easy to roll the wheels of the cart into and out of the depression 606. In addition, in the preferred embodiment, the cart dock still serves as an advertising platform, with the user of the dock being exposed to advertising when they engage or disengage a cart from the depression comprising the dock.

It will be appreciated that the dock could have other configurations. For example, the depression could have a generally "U"-shaped bottom surface (i.e. having the same shape as the bottom of the wheels of the cart). In this configuration, both the leading and second or rear edges could be at the same level as the surface, with a central or intermediate portion of the bottom surface inset into the surface.

The edges of the depression could also all be inset into the surface (instead of sloping from one or more edges, such as the leading edge). More than one depression could be provided. For example, two spaced depressions could be provided, one for each of the spaced front or rear wheels of a cart. The depression could include deeper side areas for the cart wheels and a higher (but still depressed) central section upon which the advertising is located.

In one embodiment, the depression may be much larger and be configured to accommodate one of the other cart docks of the invention (such as cart docks 20, 120, 220, 320, 420 or 520 described above, with or without other features disclosed herein, including the advertising platform (722) described below). In such embodiment, the depression is preferably sufficiently large that the cart dock structure may be located in the depression below the surface 600. In use, the wheel or wheels of the cart would be rolled into the depression and into engagement with the cart dock structure located therein (such as into the trough of one of the above-described structures.

Figure 19:
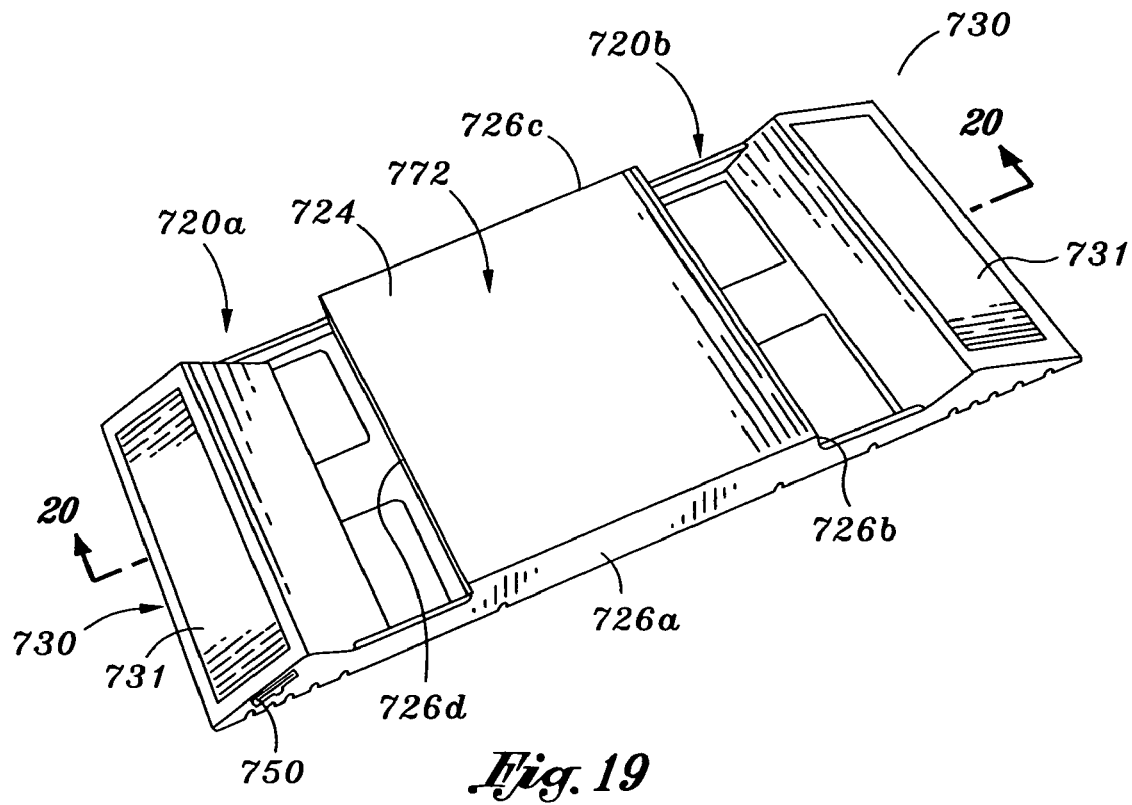
FIG. 19 is a perspective view of an advertising platform utilized with a pair of cart docks in accordance with an embodiment of the invention.

Yet another aspect of the invention is illustrated in FIGS. 19 and 20. As described above, in one embodiment, cart docks may be associated with parking spaces in a parking lot or may be otherwise oriented. Commonly, parking spaces are located on either side of a dividing line. In such instance, a cart dock may be provided for each parking space, the cart docks generally located in opposing positions on each side of the dividing line.

In this configuration, cart dock structures may be located in close proximity to one another in back-to-back orientation. Such a configuration is illustrated in FIG. 19. FIG. 19 illustrated one embodiment where a first cart dock 720a and a second cart dock 720b are located in back-to-back orientation. In this embodiment, the cart docks 720a,b have a configuration such as that illustrated in FIGS. 13–14 and described above, though they may have other configurations in accordance with the invention as described herein.

In accordance with one embodiment of the invention, an advertising platform 722 is configured to be located between the cart docks 720a,b. In a preferred embodiment, the advertising platform 722 spans the space between the cart docks 720a,b and is supported by the cart docks 720a,b.

The advertising platform 722 may have a variety of shapes and sizes. In one embodiment, the platform 722 has approximately the same width as the cart docks 720a,b. In one embodiment, the platform 722 is about 12–20 inches in depth (i.e. corresponding to the distance between the docks), but it may have a greater or lesser dimension.

The advertising platform 722 preferably has a top surface 724 which is configured to display advertising. The advertising may be printed on the top surface 724, molded into the surface, or applied to the surface in other ways, such as by affixing a printed body or sticker. The platform 722 could also include a display, such as described above and illustrated in FIG. 16.

At least a portion of the top surface 724 is preferably generally planar. In the embodiment illustrated, the top surface 724 is a continuous planar surface which extends generally parallel to a surface (e.g., a parking lot surface or the like) to which the cart docks 720a,b are mounted. The top surface 724 could have various levels or portions, and may oriented other than parallel to the support surface. For example, the top surface 724 could have generally planar first face which faces the first cart dock 720a and a generally planar second face which faces the second dock 720b. In this configuration, the first and second faces of the top surface 722 may positioned at an upwardly sloping angle to the surface (the faces meeting at a generally central ridge, in similar fashion to the first stop 326 of the cart dock 320 illustrated in FIG. 13). The top surface 724 could also be curved or arch-shaped.

As described, in a preferred embodiment, the platform 722 is preferably configured to be connected to the cart docks 720a,b. In one embodiment, the platform 722 has a first, a second, a third, and a fourth wall 726a,b,c,d extending downwardly from the top surface 722 at the edges thereof. In one embodiment, these walls 726a,b,c,d extend downwardly from the top surface 722 generally perpendicular thereto.

Referring to FIG. 20, in the embodiment cart docks 720a,b illustrated, the docks 720a,b have a second stop 728. As illustrated, platform 722 is configured so it extends over the second stop 728 of each dock 720a,b. In one embodiment, the second and fourth walls 726b,d of the platform 722 are located at the interior of the docks 720a,b.

Preferably, the platform 722 is mounted so that its top surface 724 is at generally the same height at the second stops 728 of the cart docks 720a,b. In one embodiment, the walls 726a,b,c,d each extend downwardly from the top surface 724 by approximately the same height at the height of the stops 728, whereby the bottom edges or surfaces of the walls 726a,b,c,d (or at least a portion thereof) will rest upon the supporting surface. Of course, the platform 724 could be much taller to comprise a raised advertising platform.

In order for the platform 722 to "overlap" with the stops 728 of the cart docks 720a,b, the second and fourth walls 726b,d have a cut-out through which the upwardly extending stops 728 of the dockets 720a,b may pass or extend. Of course, the platform 722 may have a variety of other configurations for engaging one or more cart docks 720a,b. The configuration may vary, at least in part, depending on the configuration of the cart dock or docks which the platform 722 is to be connected.

It is preferred that the platform be removable from the cart docks. The platform may be connected with fasteners to ensure that the platform does not unintendedly become disconnected from its supporting docks. The platform could be molded with one or more docks, however, and be integral therewith.

As illustrated, one or more ribs or legs 730 may extend downwardly at the interior of the platform 722 to provide support for the top surface 724 thereof. For example, in a parking lot environment, people may step upon the platform 722. So that the platform 722 does not collapse, the one or more ribs or legs 730 preferably aid in supporting the top surface 724.

Of course, a wide variety of other configurations of the platform are contemplated. For example, the platform could be configured to be located between (and not engage or be directly supported by) a pair of cart docks or simply extend from or connect to one cart dock.

Once again, advertising or other content is preferably displayed on or at the platform 722. Information, such as text, may be printed upon the platform. Stickers, labels or other printed materials may be connected to the top surface 724 of the platform. Of course, a display device could be connected to or supported by the platform. For example, an LCD type display as described above could be integrated into the platform and be used to display information.

Use and operation of the cart docks are as described above. In this embodiment, however, the platform provides an information bearing surface which is visible to the users of the dock(s), both generally and when a user is placing a cart in or removing a cart from an associated dock. When considering a parking lot having multiple cart docks and associated platforms, the platforms represent a significant surface area upon which advertising or other information may be displayed.

The advertising or information bearing aspects of the invention, including the various faces or surfaces of the embodiments of the cart docks and the advertising platform as just described, are significant. The ability to associate advertising with the invention allows the invention to be a revenue generating platform at the same time as addressing the cart retaining issues described above.

FIG. 19 also illustrates an additional aspect of the invention. As illustrated in FIGS. 13 and 14, the cart docks 720a, b includes a recess 731 in a front face 730 of a first stop 328. As described above, advertising or other information may be displayed in that location.

As illustrated in FIG. 20, the advertising or other information may be supported by an advertising insert 750. The insert 750 preferably comprises a supporting member for displaying the advertising or other information through the recess 731. In one embodiment, a side portion of the first stop is open, allowing the insert 750 to be slid in and out from under the first stop. As illustrated, the insert 750 may include means for inserting and removing it from the cart dock, such as a cut-out for gripping the insert 750.

The insert 750 has a top surface which is preferably aligned with the recess 731 when the insert 750 is located under the front stop. In one embodiment, the insert 750 has generally the same shape as the front stop, but is smaller, so as to fit under the first stop. In this configuration, the insert 750 has a front face which extends at the same angle as the recess 731.

The insert 750 may be constructed of a wide variety of materials. In one embodiment, the insert 750 is constructed from plastic. As indicated above, advertising or other information may be associated with the insert.

The insert 750 has a number of advantages. As described above, it may be desirable to affix the cart dock to the surface. The ability of user to remove the insert 750 allows the user to change the advertising or other information while the cart dock remains affixed to the ground.

Of course, a variety of the features of any of the cart docks 20,120,220,320,420,520 may be employed with the other, producing a wide variety of configurations thereof.

It will be understood that the above described arrangements of apparatus and the method therefrom are merely illustrative of applications of the principles of this invention and many other embodiments and modifications may be made without departing from the spirit and scope of the invention as defined in the claims.

I claim:

1. A cart dock for displaying advertising and capable of securing pairs of wheels of two or more carts comprising:

a first cart securing structure, said first cart securing structure having a first raised stop and a second raised stop, said first raised stop and second raised stop of said first card securing structure spaced from one another by a trough, said trough having a width between said first raised stop and second raised stop of said first cart securing structure, said trough having a length exceeding its width, whereby said trough is configured to simultaneously accept a pair of spaced-apart wheels of a cart, said first raised stop of said first cart securing structure having a front face;

a second cart securing structure, said second cart securing structure including a first raised stop and a second raised stop, said first raised stop and second raised stop of said second cart securing structure spaced from one another by a trough, said trough of said second cart securing structure having a width between said first raised stop and second raised stop of said second cart securing structure, said trough of said second cart securing structure having a length exceedin its width, whereby said trough of said second cart securing structure is configured to simultaneously accept a pair of spaced-apart wheels of a cart, said first raised stop of said second cart securing structure having a front face;

said first and second cart securing structures spaced from one another and oriented such that the front face of said first raised stop of said first cart securing structure faces generally in an opposing direction from said front face of said first raised stop of said second cart securing structure; and an advertising platform positioned between and engaging said first and second cart securing structures, whereby when a cart is engaged with said first cart securing structure said cart is moved in a first direction towards said advertising platform into engagement with said first raised stop of said first cart securing structure, over said first raised stop of said first cart securing structure and into said trough of said first cart securing structure, and whereby when a cart is engaged with said second cart securing structure said cart is moved in a second direction towards said advertising platform, said second direction being generally opposite said first direction, and into engagement with said first raised stop of said second cart securing structure, over said first raised stop of said second cart securing structure and into said trough of said second cart securing structure.

2. The cart dock in accordance with claim 1 wherein said cart dock is configured to be supported upon a support surface and wherein a top surface of said advertising platform is elevated above said support surface when said cart dock is placed on said support surface.

3. The cart dock in accordance with claim 2 wherein said advertising platform has a top surface and at least two downwardly extending walls elevating said top surface.

4. The cart dock in accordance with claim 1 wherein said platform is detachably connected to said first and second cart securing structures.

5. The cart dock in accordance with claim 1 wherein said front face of said first raised stop of said first cart securing structure defines an insert configured to receive advertising.

6. The cart dock in accordance with claim 1 wherein said front face of said first raised stop of said second cart securing structure defines an insert configured to receive advertising.

7. The cart dock in accordance with claim 1 wherein at least one opening is formed in said trough of said first cart securing structure and at least one opening is formed in said trough of said second cart securing structure.

8. The cart dock in accordance with claim 1 wherein said platform has a top surface and at least a pair of spaced downwardly extending walls, said walls configured to be placed over said second stops of said first and second cart securing structures to detachably connect said platform to said first and second cart securing structures.

9. A cart dock for displaying advertising and capable of securing pairs of wheels of two or more carts comprising:
   an advertising platform having a first end and a second end, said first and second ends located generally opposite one another;
   a first cart securing structure located at said first end of said advertising platform, said first cart securing structure including a first raised stop and cooperating with said platform to define a second raised stop and wherein a trough is defined between said first raised stop and said second raised stop of said first cart securing platform; and
   a second cart securing structure located at said second end of said advertising platform, said second cart securing structure including a first raised stop and cooperating with said platform to define a second raised stop and wherein a trough is defined between said first raised stop and said second raised stop of said second cart securing platform.

10. The cart dock in accordance with claim 9 wherein said first end of said advertising platform engages said first cart securing structure to define said second stop thereof and said second end of said advertising platform engages said second cart securing structure to define said second stop thereof.

11. The cart dock in accordance with claim 9 wherein said trough of said first cart securing structure is elongate in relation to a width between said first and second stops thereof for at the same time receiving both the spaced front or rear wheels of a cart and wherein said trough of said second cart securing structure is elongate in relation to a width between said first and second stops thereof for at the same time receiving both the spaced front or rear wheels of a cart.

12. The cart dock in accordance with claim 9 wherein said first and second ends of said advertising platform comprise downwardly extending walls, said walls extending over upwardly extending portions of said first and second cart securing structures.

13. The cart dock in accordance with claim 9 wherein said first raised stop of said first cart securing structure has a sloping front face over which the wheels of a cart may be rolled into engagement with said trough of said first cart securing structure and said first raised stop of said second cart securing structure has a sloping front face over which the wheels of a cart may be rolled into engagement with said trough of said second cart securing structure.

14. The cart dock in accordance with claim 9 wherein said first cart securing structure has a first side and a second side, said trough and first raised stop of said first cart securing structure extend generally transverse to said first and second sides of said cart securing structure, wherein said second cart securing structure has a first side and a second side, said trough and first raised stop of said second cart securing structure extend generally transverse to said first and second sides of said second cart securing structure, and wherein said first side of said first cart securing structure is generally aligned with said first side of said second cart securing structure and said second side of said first cart securing structure is generally aligned with said second side of said second cart securing structure.

15. The cart dock in accordance with claim 14 wherein said advertising platform has a width which is coextensive with a distance between said first and second sides of said first and second cart securing structures.

16. The cart dock in accordance with claim 14 wherein a side wall extends upwardly at a first end and a second end of said trough of said first cart securing structure at said first and second sides of said cart securing structure and a side wall extends upwardly at a first end and a second end of said trough of said second cart securing structure at said first and second sides of said second cart securing structure.

* * * * *